United States Patent
Matsuno et al.

(10) Patent No.: US 10,935,966 B2
(45) Date of Patent: Mar. 2, 2021

(54) PRODUCT INSPECTION DEVICE, PRODUCT INSPECTION METHOD, AND COMPUTER PROGRAM

(71) Applicant: Murata Manufacturing Co., Ltd., Nagaokakyo (JP)

(72) Inventors: Yuki Matsuno, Nagaokakyo (JP); Teruhisa Tsuru, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 781 days.

(21) Appl. No.: 15/708,708

(22) Filed: Sep. 19, 2017

(65) Prior Publication Data

US 2018/0003594 A1  Jan. 4, 2018

Related U.S. Application Data

(63) Continuation of application No. PCT/JP2016/051093, filed on Jan. 15, 2016.

(30) Foreign Application Priority Data

Mar. 20, 2015 (JP) .............................. JP2015-057792

(51) Int. Cl.
  G05B 19/418 (2006.01)
  G06F 17/18 (2006.01)
  (Continued)

(52) U.S. Cl.
  CPC ..... G05B 19/41875 (2013.01); G01M 99/008 (2013.01); G06F 17/18 (2013.01);
  (Continued)

(58) Field of Classification Search
  CPC .... G05B 19/41875; G05B 2219/32368; G07C 3/14; G06F 17/18; G06Q 10/0635; G06Q 50/04
  See application file for complete search history.

(56) References Cited

U.S. PATENT DOCUMENTS 8,428,985 B1 * 4/2013 Puskorius .............. G06Q 10/00
  705/7.11
9,037,436 B2 * 5/2015 Tsuru ................. G06Q 10/0635
  702/181

(Continued)

FOREIGN PATENT DOCUMENTS

| CN | 102449645 A | 5/2012 |
| JP | 2007-139621 A | 6/2007 |
| JP | 5477382 B2 | 4/2014 |

OTHER PUBLICATIONS

Deaver et al., "Managing Calibration Confidence in the Real World," NCSL Workshop & Symposium, 1995, Session 2A, pp. 1-17.

(Continued)

Primary Examiner — Stephanie E Bloss
(74) Attorney, Agent, or Firm — Arent Fox LLP

(57) ABSTRACT

A product inspection device and method for correctly calculating consumer and producer risks irrespective of the type of distribution of products. A characteristic value representing a predetermined product characteristic is measured for each product as a product measurement value, and a standard deviation of measurement variations in measurement results is calculated as a measurement value standard deviation. The products are determined to be conforming based on whether the measured product measurement value falls within a range of a product standard. Consumer and producer risks are calculated based on the measurement variations. The calculated consumer and producer risks are respectively and successively added up and it is determined whether the number of products having undergone the adding have reached a predetermined number. If so, the added up consumer risk and producer risk are divided by the number of products to calculate a final consumer risk and a final producer risk.

15 Claims, 23 Drawing Sheets

(51) Int. Cl.
*G06Q 50/04* (2012.01)
*G07C 3/14* (2006.01)
*G01M 99/00* (2011.01)
*G06Q 10/06* (2012.01)

(52) U.S. Cl.
CPC ......... *G06Q 10/0635* (2013.01); *G06Q 50/04* (2013.01); *G07C 3/14* (2013.01); *G05B 2219/32368* (2013.01); *Y02P 90/30* (2015.11)

(56) References Cited

U.S. PATENT DOCUMENTS

| | | | | |
|---|---|---|---|---|
| 2012/0072174 A1* | 3/2012 | Tsuru | ........................ | B07C 5/00 |
| | | | | 702/181 |
| 2012/0095803 A1* | 4/2012 | Tsuru | .................... | G01M 99/00 |
| | | | | 705/7.28 |
| 2014/0324521 A1* | 10/2014 | Mun | ..................... | G06Q 10/04 |
| | | | | 705/7.28 |
| 2015/0371134 A1* | 12/2015 | Chien | ..................... | G06N 3/02 |
| | | | | 706/21 |

OTHER PUBLICATIONS

International Search Report issued in International Patent Application No. PCT/JP2016/051093, dated Mar. 22, 2016.
Written Opinion of the International Searching Authority issued in International Patent Application No. PCT/JP2016/051093, dated Mar. 22, 2016.

\* cited by examiner

PRIOR ART

FIG. 12

| DERIVED ITEM | METHOD ACCORDING TO FIRST EMBODIMENT | TRUE VALUE | METHOD ACCORDING TO PRIOR ART |
|---|---|---|---|
| CONSUMER RISK (ppm) | 1.10140E+02 | 1.04125E+02 | 9.08824E+01 |
| PRODUCER RISK (ppm) | 1.55786E+05 | 1.59175E+05 | 1.53671E+05 |
| CONFORMING ARTICLE RATE (%) | 65.7614 | 65.93252 | 68.76411 |

FIG. 15

| DERIVED ITEM | METHOD ACCORDING TO SECOND EMBODIMENT | TRUE VALUE | METHOD ACCORDING TO PRIOR ART |
|---|---|---|---|
| CONSUMER RISK (ppm) | 1.06185E+02 | 1.04125E+02 | 9.08824E+01 |
| PRODUCER RISK (ppm) | 1.58939E+05 | 1.59175E+05 | 1.53671E+05 |
| CONFORMING ARTICLE RATE (%) | 66.07605 | 65.93252 | 68.76411 |

PRODUCT INSPECTION DEVICE, PRODUCT INSPECTION METHOD, AND COMPUTER PROGRAM

CROSS REFERENCE TO RELATED APPLICATIONS

The present application is a continuation of PCT/JP2016/051093 filed Jan. 15, 2016, which claims priority to Japanese Patent Application No. 2015-057792, filed Mar. 20, 2015, the entire contents of each of which are incorporated herein by reference.

TECHNICAL FIELD

The present disclosure relates to a product inspection device, a product inspection method, and a computer program for inspecting products.

BACKGROUND

Before shipment, products have their respective characteristic values representing a predetermined characteristic measured, to be classified under conforming articles or defective articles depending on whether or not their respective characteristic values satisfy a predetermined standard. The classification of products is performed by comparing, using a product inspection device, the measured characteristic values of the products against an inspection standard, which is more rigorous in conditions than a product standard (a characteristic value required of the products). When variations in the measured characteristic values of the products are simply attributed to variations in the characteristic values of the products themselves, the product inspection device can correctly classify the products under conforming articles or defective articles even with the inspection standard that is identical in conditions to the product standard.

However, variations in the measured characteristic values of the products are attributed not only to variations in the characteristic values of the product themselves, but also attributed to measurement performed by the measurement system. Accordingly, products determined as conforming articles by the product inspection device may contain a product actually failing to satisfy the product standard, or products determined as defective articles may contain a product actually satisfying the product standard. In particular, in view of any effect on the users of the products, it is necessary to reduce the possibility that a product determined as a conforming article by the product inspection device is actually a product failing to satisfy the product standard. Hence, normally products are inspected under the inspection standard which is more rigorous in conditions than the product standard.

Here, in the product inspection device, a probability that a product failing to satisfy the product standard is erroneously determined as a conforming article based on the inspection standard is referred to as a "consumer risk". Moreover, a probability that a product satisfying the product standard is erroneously determined as a defective article based on the inspection standard is referred to as a "producer risk". It is generally known that setting the inspection standard as more rigorous in conditions than the product standard reduces the consumer risk, but it conversely increases the producer risk and reduces the rate of products being determined as conforming articles (the conforming article rate) by the product inspection device.

An increased consumer risk increases the possibility that the product inspection device determines a product failing to satisfy the product standard as a conforming article. This increases the possibility that products failing to satisfy the product standard are erroneously shipped to the users. Further, an increased producer risk increases the possibility that the product inspection device determines a product satisfying the product standard as a defective article. This reduces the rate of products determined as conforming articles (the conforming article rate).

For example, Patent Document 1 (identified below) discloses a product inspection device that changes the inspection standard based on at least one of the consumer risk and the producer risk, and determines whether or not all products contained in a product lot are conforming articles with reference to the changed inspection standard. According to Patent Document 1, the upper limit value and the lower limit value in the inspection standard can be changed based on one of or both of the consumer risk and the producer risk and, therefore, the inspection standard can be set so that the consumer risk becomes equal to or smaller than a predetermined consumer risk that is applied in inspecting the characteristic value of each of the products for shipment.

Patent Document 1: Japanese Patent Publication No. 5477382.

Non-Patent Document 1: David Deaver, "Managing Calibration Confidence in the Real World", NCSL International Workshop and Symposium, 1995.

Patent Document 1 discloses estimating a distribution of conforming articles satisfying the product standard and a distribution of defective articles failing to satisfy the product standard, based on the premise that the distribution of the products is a known distribution such as the normal distribution, the triangular distribution, the rectangular distribution. Here, Patent Document 1 is associated with a problem that, unless the distribution of the products is previously checked during manufacture, it is difficult to estimate the correct conforming article/defective article distribution. That is, when the distribution of the products largely deviates from any known distribution, accuracy in estimating the distribution of the conforming article/defective article becomes low, and the consumer risk and the producer risk cannot be correctly calculated.

SUMMARY

The present disclosure has been made in light of the foregoing, and an object thereof is to provide a product inspection device, a product inspection method, and a computer program, with which the consumer risk and the producer risk can be calculated irrespective of the type of the product distribution.

In order to achieve the object stated above, an exemplary product inspection device as disclosed herein includes a measuring unit that measures, for each of products as a product measurement value, a characteristic value representing a predetermined characteristic of the products; a measurement value standard deviation calculating unit that calculates, as a measurement value standard deviation, a standard deviation of measurement variations representing variations in measurement results of the measuring unit itself; and a determining unit that determines, with reference to a product standard defining an upper limit value and a lower limit value of the characteristic values for determining conformity/defectiveness of the products, whether or not each of the products is a conforming article depending on whether or not the measured product measurement value falls within a range from the upper limit value to the lower limit value inclusive. The exemplary device further includes a risk calculating unit that calculates, based on the measurement variations, a consumer risk that is a probability of any of the products failing to satisfy the product standard being erroneously determined as a conforming article by the measurement variations, and a producer risk that is a probability of any of the products satisfying the product standard being erroneously determined as a defective article by the measurement variations; a risk adding unit that respectively and successively adds up the calculated consumer risk and the calculated producer risk; an added count determining unit that determines whether or not a number of products having undergone the adding has reached a predetermined number of products; and a final risk calculating unit that calculates, when the added count determining unit determines that the number of products having undergone the adding has reached the predetermined number of products, a final consumer risk and a final producer risk by dividing the added up consumer risk and the added up producer risk by the number of products.

In the configuration described above, characteristic values representing a predetermined characteristic of products are measured as product measurement values, and a standard deviation of measurement variations representing variations in measurement results of the measuring unit itself is obtained as a measurement value standard deviation. With reference to a product standard defining an upper limit value and a lower limit value of the characteristic values for determining conformity/defectiveness of the products, whether or not each of the products is a conforming article is determined depending on whether or not the measured product measurement value falls within a range from the upper limit value to the lower limit value inclusive. Based on the measurement variations, a consumer risk that is a probability of any of the products failing to satisfy the product standard being erroneously determined as a conforming article by the measurement variations, and a producer risk that is a probability of any of the products satisfying the product standard being erroneously determined as a defective article by the measurement variations are calculated. The calculated consumer risk and producer risk are respectively and successively added up. When the number of products having undergone the adding has reached a predetermined number of products, the added up consumer risk and the added up producer risk are divided by the number of products, to obtain a final consumer risk and a final producer risk. Thus, the consumer risk and the producer risk for the whole products are respectively added up and divided by the number of products, thereby obtaining the final consumer risk and the final producer risk. That is, the consumer risk and the producer risk are calculated independently of the product distribution, whereby accuracy in determining the conforming article improves.

Further, the product inspection device of the exemplary aspect preferably includes: a deemed-basis calculating unit that calculates an average value of the measured product measurement values as a deemed average value, and calculates a standard deviation of the measured product measurement values as a deemed standard deviation; a variance calculating unit that calculates a measurement variations variance based on the calculated deemed average value, and calculates a deemed variance based on the calculated deemed standard deviation; and a data processing unit that calculates a product estimated value by adding the calculated deemed average value to a value obtained by multiplying a square root of (1−the measurement variations variance/the deemed variance) by a deviation of the product measurement values.

In the configuration described above, an average value of the measured product measurement values is calculated as a deemed average value, and a standard deviation of the measured product measurement values is calculated as a deemed standard deviation. A measurement variations variance is calculated based on the calculated deemed average value, and a deemed variance is calculated based on the calculated deemed standard deviation. A product estimated value is calculated by adding the calculated deemed average value to a value obtained by multiplying a square root of (1−the measurement variations variance/the deemed variance) by a deviation of the product measurement values. Thus, the consumer risk and the producer risk are calculated based on estimated values which are obtained by eliminating measurement variations from the measured values, whereby accuracy in determining the conforming article further improves.

Still further, the product inspection device of the exemplary aspect preferably includes: a product measurement value acquiring unit that acquires, for a plurality of times, the product measurement values relating to a certain number of products upon starting a screening of a product lot; a measurement variations standard deviation calculating unit that calculates the standard deviation of measurement variations for each of the products; and an average value calculating unit that calculates an average value of the calculated standard deviation of measurement variations, wherein the average value of the standard deviation of measurement variations is deemed as a standard deviation of measurement variations for the whole products.

In the configuration described above, the product measurement values relating to a certain number of products are acquired for a plurality of times upon starting a screening of a product lot. The standard deviation of measurement variations is calculated for each of the products. An average value of the calculated standard deviation of measurement variations is deemed as a standard deviation of measurement variations for the whole products. Thus, the standard deviation of measurement variations of the product measurement values is obtained at higher accuracy, whereby the consumer risk and the producer risk are calculated at higher accuracy.

Still further, the product inspection device preferably accepts setting of a determination region of a predetermined range on a conforming article side in the product standard, the product inspection device determines whether or not each of the measured product measurement values falls within the determination region, when the product inspection device determines that the measured product measurement value falls within the determination region, the product inspection device subtracts, from the calculated consumer risk, a probability of a re-measured product measurement value being correctly determined in a conforming/defective determination, and the product inspection device adds, to the calculated producer risk, a probability of the re-measured product measurement value being erroneously determined in the conforming/defective determination.

In the configuration described above, the product inspection device accepts setting of a determination region of a predetermined range on a conforming article side in the product standard, and determines whether or not each of the measured product measurement values falls within the determination region. When the product inspection device determines that the measured product measurement value falls within the measured determination region, the product inspection device subtracts, from the calculated consumer risk, a probability of a re-measured product measurement value being correctly determined in a conforming/defective determination. Thus, accuracy of the measuring unit is artificially improved, to thereby reduce the consumer risk.

Next, in order to achieve the object stated above, a product inspection method is provide that is capable of being executed by a product inspection device inspecting products. According to an exemplary aspect, the product inspection method includes measuring, for each of products as a product measurement value, a characteristic value representing a predetermined characteristic of the products; calculating, as a measurement value standard deviation, a standard deviation of measurement variations representing variations in measurement results; with reference to a product standard defining an upper limit value and a lower limit value of the characteristic values for determining conformity/defectiveness of the products, determining whether or not each of the products is a conforming article depending on whether or not the measured product measurement value falls within a range from the upper limit value to the lower limit value inclusive; calculating, based on the measurement variations, a consumer risk that is a probability of any of the products failing to satisfy the product standard being erroneously determined as a conforming article by the measurement variations, a producer risk that is a probability of any of the products satisfying the product standard being erroneously determined as a defective article by the measurement variations; respectively and successively adding up the calculated consumer risk and the calculated producer risk; determining whether or not a number of products having undergone the adding has reached a predetermined number of products; and calculating, when the number of products having undergone the adding is determined to have reached the predetermined number of products, a final consumer risk and a final producer risk by dividing the added up consumer risk and the producer risk by the number of products.

In the configuration described above, characteristic values representing a predetermined characteristic of products are measured as product measurement values, and a standard deviation of measurement variations representing variations in measurement results is obtained as a measurement value standard deviation. With reference to a product standard defining an upper limit value and a lower limit value of the characteristic values for determining conformity/defectiveness of the products, whether or not each of the products is a conforming article is determined depending on whether or not the measured product measurement value falls within a range from the upper limit value to the lower limit value inclusive. Based on the measurement variations, a consumer risk that is a probability of any of the products failing to satisfy the product standard being erroneously determined as a conforming article by the measurement variations, and a producer risk that is a probability of any of the products satisfying the product standard being erroneously determined as a defective article by the measurement variations are calculated. The calculated consumer risk and producer risk are respectively and successively added up. When the number of products having undergone the adding has reached a predetermined number of products, the added up consumer risk and the added up producer risk are divided by the number of products, to obtain a final consumer risk and a final producer risk. Thus, the consumer risk and the producer risk for the whole products are respectively added up and divided by the number of products, thereby obtaining the final consumer risk and the final producer risk. That is, the consumer risk and the producer risk are calculated independently of the product distribution, whereby accuracy in determining the conforming article improves.

Further, in the product inspection method of the exemplary aspect, the product inspection method preferably further includes: calculating an average value of the measured product measurement values as a deemed average value, and calculates a standard deviation of the measured product measurement values as a deemed standard deviation; calculating a measurement variations variance based on the calculated deemed average value, and calculating a deemed variance based on the calculated deemed standard deviation; and calculating a product estimated value by adding the calculated deemed average value to a value obtained by multiplying a square root of (1−the measurement variations variance/the deemed variance) by a deviation of the product measurement values.

In the configuration described above, an average value of the measured product measurement values is calculated as a deemed average value, and a standard deviation of the measured product measurement values is calculated as a deemed standard deviation. A measurement variations variance is calculated based on the calculated deemed average value, and a deemed variance is calculated based on the calculated deemed standard deviation. A product estimated value is calculated by adding the calculated deemed average value to a value obtained by multiplying a square root of (1−the measurement variations variance/the deemed variance) by a deviation of the product measurement values. Thus, the consumer risk and the producer risk are calculated based on estimated values which are obtained by eliminating measurement variations from the measured values, whereby accuracy in determining the conforming article further improves.

Still further, in the product inspection method of the exemplary aspect, the product inspection method preferably further includes: acquiring, for a plurality of times, the product measurement values relating to a certain number of products upon starting a screening of a product lot; calculating the standard deviation of measurement variations for each of the products; and calculating an average value of the calculated standard deviation of measurement variations, wherein the average value of the standard deviation of measurement variations is deemed as a standard deviation of measurement variations for the whole products.

In the configuration described above, the product measurement values relating to a certain number of products are acquired for a plurality of times upon starting a screening of a product lot. The standard deviation of measurement variations is calculated for each of the products. An average value of the calculated standard deviation of measurement variations is deemed as a standard deviation of measurement variations for the whole products. Thus, the standard deviation of measurement variations of the product measurement values is obtained at higher accuracy, whereby the consumer risk and the producer risk are calculated at higher accuracy.

Still further, in the product inspection method of the exemplary aspect, the product inspection method preferably further includes: accepting setting of a determination region of a predetermined range on a conforming article side in the product standard; determining whether or not each of the measured product measurement values falls within the determination region; when the measured product measurement value is determined to fall within the determination region, subtracting, from the calculated consumer risk, a probability of a re-measured product measurement value being correctly determined in a conforming/defective determination; and adding, to the calculated producer risk, a probability of the re-measured product measurement value being erroneously determined in the conforming/defective determination.

In the configuration described above, the product inspection device accepts setting of a determination region of a predetermined range on a conforming article side in the product standard, and determines whether or not each of the measured product measurement values falls within the determination region. When the product inspection device determines that the measured product measurement value falls within the measured determination region, the product inspection device subtracts, from the calculated consumer risk, a probability of a re-measured product measurement value being correctly determined in a conforming/defective determination. Thus, accuracy of the measuring unit is artificially improved, to thereby reduce the consumer risk.

Next, in order to achieve the object stated above, a non-transitory computer readable medium is provided for storing a computer program with computer executable instructions that are capable of being executed with a product inspection device. The computer executable instructions are provided for measuring, for each of products as a product measurement value, a characteristic value representing a predetermined characteristic of the products; calculating, as a measurement value standard deviation, a standard deviation of measurement variations representing variations in measurement results; determining, with reference to a product standard defining an upper limit value and a lower limit value of the characteristic values for determining conformity/defectiveness of the products, whether or not each of the products is a conforming article depending on whether or not the measured product measurement value falls within a range from the upper limit value to the lower limit value inclusive; calculating, based on the measurement variations, a consumer risk that is a probability of any of the products failing to satisfy the product standard being erroneously determined as a conforming article by the measurement variations, and a producer risk that is a probability of any of the products satisfying the product standard being erroneously determined as a defective article by the measurement variations; respectively and successively adding up the calculated consumer risk and the calculated producer risk; determining whether or not a number of products having undergone the adding has reached a predetermined number of products; and calculating, when the number of products having undergone the adding has reached the predetermined number of products, a final consumer risk and a final producer risk by dividing the added up consumer risk and the added up producer risk by the number of products.

In the configuration described above, characteristic values representing a predetermined characteristic of products are measured as product measurement values, and a standard deviation of measurement variations representing variations in measurement results itself is obtained as a measurement value standard deviation. With reference to a product standard defining an upper limit value and a lower limit value of the characteristic values for determining conformity/defectiveness of the products, whether or not each of the products is a conforming article is determined depending on whether or not the measured product measurement value falls within a range from the upper limit value to the lower limit value inclusive. Based on the measurement variations, a consumer risk that is a probability of any of the products failing to satisfy the product standard being erroneously determined as a conforming article by the measurement variations, and a producer risk that is a probability of any of the products satisfying the product standard being erroneously determined as a defective article by the measurement variations are calculated. The calculated consumer risk and producer risk are respectively and successively added up. When the number of products having undergone the adding has reached a predetermined number of products, the added up consumer risk and the added up producer risk are divided by the number of products, to obtain a final consumer risk and a final producer risk. Thus, the consumer risk and the producer risk for the whole products are respectively added up and divided by the number of products, thereby obtaining the final consumer risk and the final producer risk. That is, the consumer risk and the producer risk are calculated independently of the product distribution, whereby accuracy in determining the conforming article improves.

Further, according to an exemplary aspect, computer executable instructions are provided for calculating an average value of the measured product measurement values as a deemed average value, and calculating a standard deviation of the measured product measurement values as a deemed standard deviation; calculating a measurement variations variance based on the calculated deemed average value, and calculating a deemed variance based on the calculated deemed standard deviation; and calculating a product estimated value by adding the calculated deemed average value to a value obtained by multiplying a square root of (1−the measurement variations variance/the deemed variance) by a deviation of the product measurement values.

In the configuration described above, an average value of the measured product measurement values is calculated as a deemed average value, and a standard deviation of the measured product measurement values is calculated as a deemed standard deviation. A measurement variations variance is calculated based on the calculated deemed average value, and a deemed variance is calculated based on the calculated deemed standard deviation. A product estimated value is calculated by adding the calculated deemed average value to a value obtained by multiplying a square root of (1−the measurement variations variance/the deemed variance) by a deviation of the product measurement values. Thus, the consumer risk and the producer risk are calculated based on estimated values which are obtained by eliminating measurement variations from the measured values, whereby accuracy in determining the conforming article further improves.

Still further, according to an exemplary aspect, computer executable instructions are provided for acquiring, for a plurality of times, the product measurement values relating to a certain number of products upon starting a screening of a product lot; calculating the standard deviation of measurement variations for each of the product; and calculating an average value of the calculated standard deviation of measurement variations, wherein the average value of the standard deviation of measurement variations is deemed as a standard deviation of measurement variations for the whole products.

In the configuration described above, the product measurement values relating to a certain number of products are acquired for a plurality of times upon starting a screening of a product lot. The standard deviation of measurement variations is calculated for each of the products. An average value of the calculated standard deviation of measurement variations is deemed as a standard deviation of measurement variations for the whole products. Thus, the standard deviation of measurement variations of the product measurement values is obtained at higher accuracy, whereby the consumer risk and the producer risk are calculated at higher accuracy.

Still further, according to an exemplary aspect, computer executable instructions are provided for accepting setting of a determination region of a predetermined range on a conforming article side in the product standard; determining whether or not each of the measured product measurement values falls within the determination region; subtracting, when the measured product measurement value falls within the determination region, from the calculated consumer risk, a probability of a re-measured product measurement value being correctly determined in a conforming/defective determination; and madding, when the measured product measurement value falls within the determination region, to the calculated producer risk, a probability of the re-measured product measurement value being erroneously determined in the conforming/defective determination.

In the configuration described above, the product inspection device accepts setting of a determination region of a predetermined range on a conforming article side in the product standard, and determines whether or not each of the measured product measurement values falls within the determination region. When the product inspection device determines that the measured product measurement value falls within the measured determination region, the product inspection device subtracts, from the calculated consumer risk, a probability of a re-measured product measurement value being correctly determined in a conforming/defective determination. Thus, accuracy of the measuring unit is artificially improved, to thereby reduce the consumer risk.

With the exemplary product inspection device, the exemplary product inspection method, and the exemplary computer program, the consumer risk and the producer risk for the whole products are respectively added up and divided by the number of products, thereby obtaining the final consumer risk and the final producer risk. That is, the consumer risk and the producer risk are calculated independently of the product distribution, whereby accuracy in determining the conforming article improves.

BRIEF DESCRIPTION OF THE DRAWINGS

FIG. 12 is a table showing the calculation accuracy of a conforming article rate with the product inspection device according to the first exemplary embodiment.

FIG. 15 is a table showing the calculation accuracy of the conforming article rate with the product inspection device according to the second exemplary embodiment.

DETAILED DESCRIPTION

In the following, with reference to the drawings, a specific description will be given of a product inspection device capable of inspecting products based on the consumer risk and the producer risk according to exemplary embodiments disclosed herein. The following embodiments do not restrict the invention described in the claims, and it goes without saying that not every combination of characteristics described in the exemplary embodiments is essential for solving the above-stated problems.

In the following embodiments, while a description will be given of a product inspection device having a computer program installed in a computer system, it should be apparent to those skilled in the art that some exemplary embodiments can be realized as a computer executable program. Accordingly, the present invention may take the form of an embodiment as hardware being a product inspection device; an embodiment as software; or an embodiment as a combination of software and hardware. The computer program can be recorded on any computer readable medium such as a hard disk, a DVD, a CD, an optical storage device, or a magnetic storage device.

First Embodiment

Figure 1:
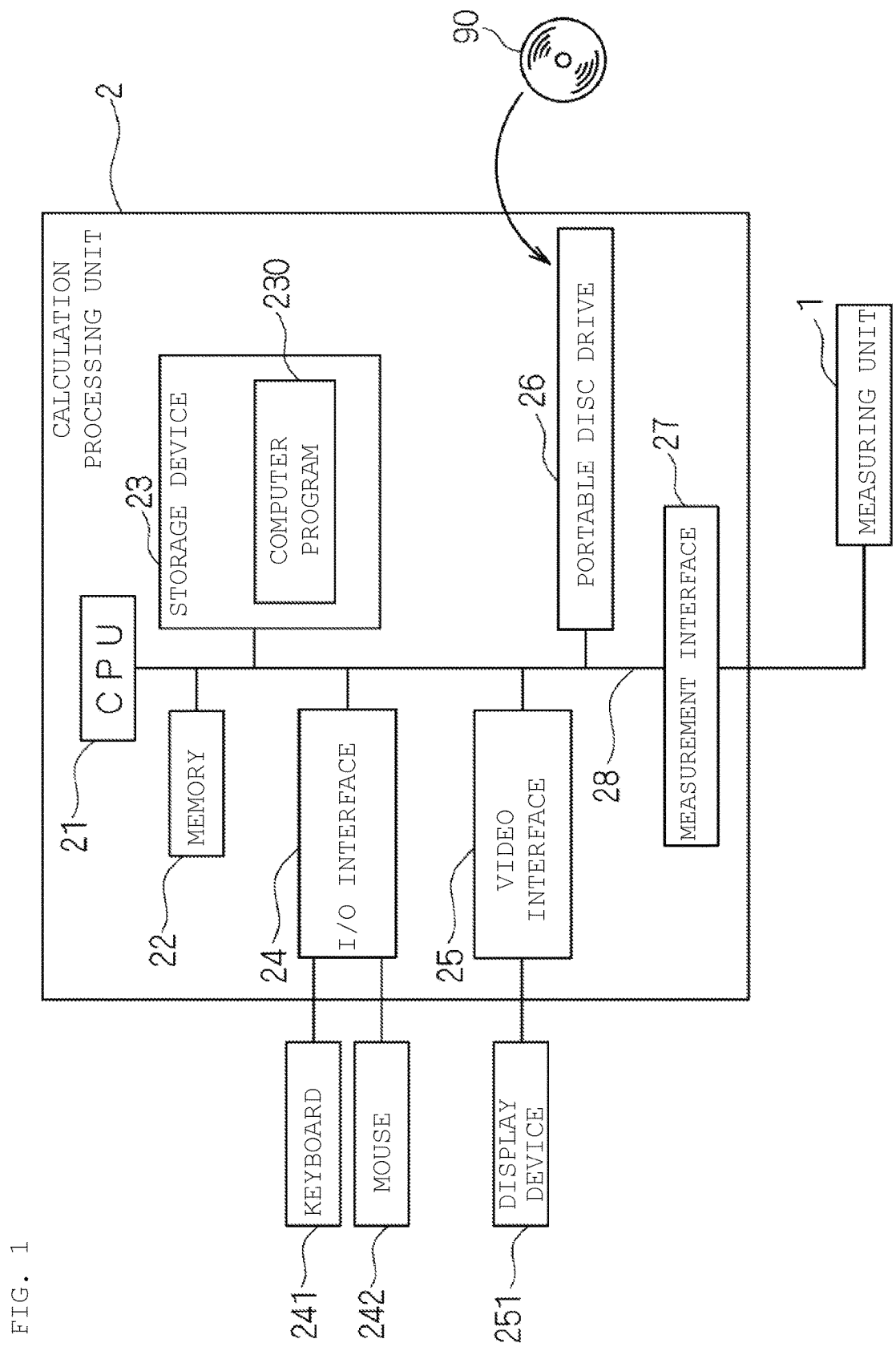
FIG. 1 is a block diagram showing an exemplary configuration of a product inspection device according to a first exemplary embodiment.

FIG. 1 is a block diagram showing an exemplary configuration of a product inspection device according to a first exemplary embodiment. The product inspection device according to the first embodiment includes a measuring unit 1 that measures a characteristic value representing a predetermined characteristic of a product, and a calculation processing unit 2 that calculates the measured characteristic value.

The measuring unit 1 measures the characteristic value representing a predetermined characteristic of a product as a product measurement value. For example, when the product is a ceramic capacitor, the measuring unit 1 measures capacitance, which is the product measurement value. The hardware configuration of the measuring unit 1 that measures capacitance may be an LCR meter.

According to an exemplary aspect, the calculation processing unit 2 is configured at least by a CPU (Central Processing Unit) 21, a memory 22, a storage device 23, an I/O interface 24, a video interface 25, a portable disc drive 26, a measurement interface 27, and an internal bus 28 that connects the foregoing hardware elements to each other.

The CPU 21 is connected to each of the foregoing hardware elements of the calculation processing unit 2 via the internal bus 28, to control the operations of the hardware elements and execute various software functions according to a computer program 230 stored in the storage device 23. The memory 22 is configured by a volatile memory such as an SRAM or an SDRAM, where a load module is loaded upon execution of the computer program 230 to store temporary data and the like generated in the execution of the computer program 230.

The storage device 23 is configured by a built-in fixed storage device (hard disk), a ROM or the like. The computer program 230 stored in the storage device 23 is downloaded, by the portable disc drive 26, from a portable recording medium 90 such as a DVD or a CD-ROM having information such as the program and data recorded therein. When being executed, the computer program 230 is loaded from the storage device 23 into the memory 22. As a matter of course, the computer program 230 may be a computer program downloaded from an external computer connected to a network.

The measurement interface 27 is connected to the internal bus 28, thereby connected to the measuring unit 1. Thus, the measuring unit 1 and the calculation processing unit 2 can exchange product measurement values or control signals and the like.

The I/O interface 24 is connected to data input media such as a keyboard 241 and a mouse 242, to receive data input. Further, the video interface 25 is connected to a display device 251 such as a CRT monitor or an LCD, to display predetermined images.

Figure 2:
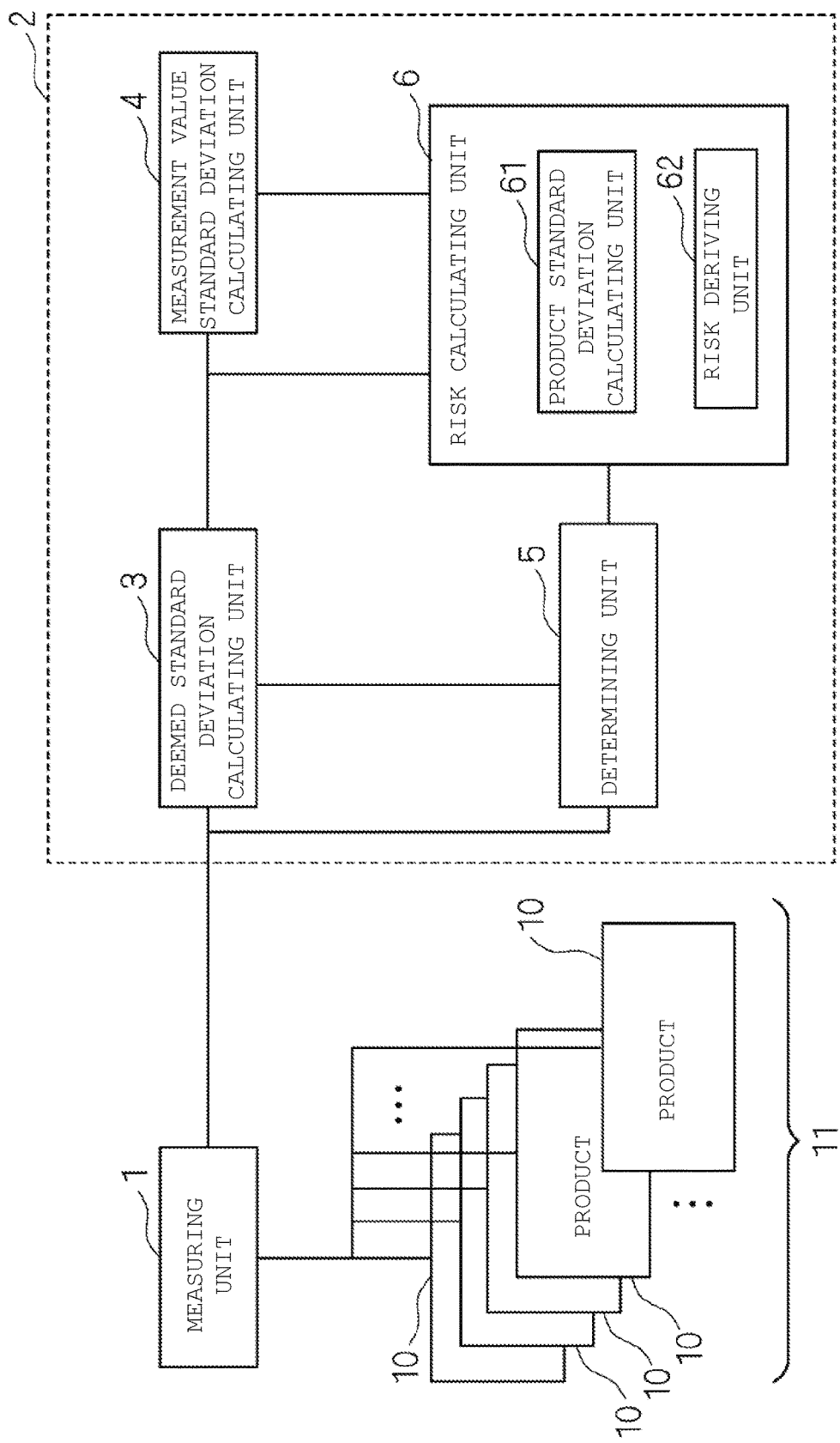
FIG. 2 is a functional block diagram of a conventional product inspection device.

In the following, a description will be given of an operation of the product inspection device configured as described above. FIG. 2 is a functional block diagram of a conventional product inspection device. The measuring unit 1 measures, as a product measurement value, a characteristic value representing a predetermined characteristic of each of products 10. As one unit, a product lot 11 consists of a predetermined number of products 10.

A deemed standard deviation calculating unit 3 calculates, as a deemed standard deviation, a standard deviation of variations in the characteristic value, which is obtained by measuring part of the products 10 contained in the product lot 11. For example, when the product lot 11 consists of 100,000 pieces of products 10, the measuring unit 1 samples 10,000 pieces of products 10 out of the product lot 11, to measure the characteristic values of the products 10 as the product measurement values. Further, the deemed standard deviation calculating unit 3 calculates the standard deviation of variations in the product measurement values as the deemed standard deviation. It is noted that, the deemed standard deviation calculating unit 3 can also calculate, in addition to calculating the deemed standard deviation, the average value of the product measurement values of the products 10.

Before measuring the product lot 11, the measurement value standard deviation calculating unit 4 previously calculates, as a measurement value standard deviation by a predetermined method, a standard deviation of measurement variations which represent variations in the measured product measurement values. The method of calculating the standard deviation of measurement variations may be, for example, a scheme of evaluating uncertainty, or Measurement system analysis MSA (Measurement Systems Analysis) defined in Particular requirements (ISO/TS 16949) for automotive production and relevant service part organizations of Quality management systems (ISO 9001:2000) of the ISO standards, for example.

The scheme of evaluating uncertainty includes dividing the system of the measuring unit 1 into elements such as measurement jigs, sensors and the like associated with uncertainty; and evaluating uncertainty for each element, to calculate the standard deviation of measurement variations, which is the uncertainty of the entire system of the measuring unit 1. Measurement system analysis MSA calculates the standard deviation of measurement variations using the GR & R (Gage Repeatability and Reproducibility) scheme.

It is noted that a deemed standard deviation TV calculated by the deemed standard deviation calculating unit 3 can be expressed as (Equation 1) using a product standard deviation PV which is a standard deviation of variations in the characteristic values of the products themselves, and a measurement value standard deviation GRR calculated by the measurement value standard deviation calculating unit 4.

[Mathematic Expression 1]

$$TV^2 = PV^2 + GRR^2 \quad \text{(Equation 1)}$$

Figure 3:
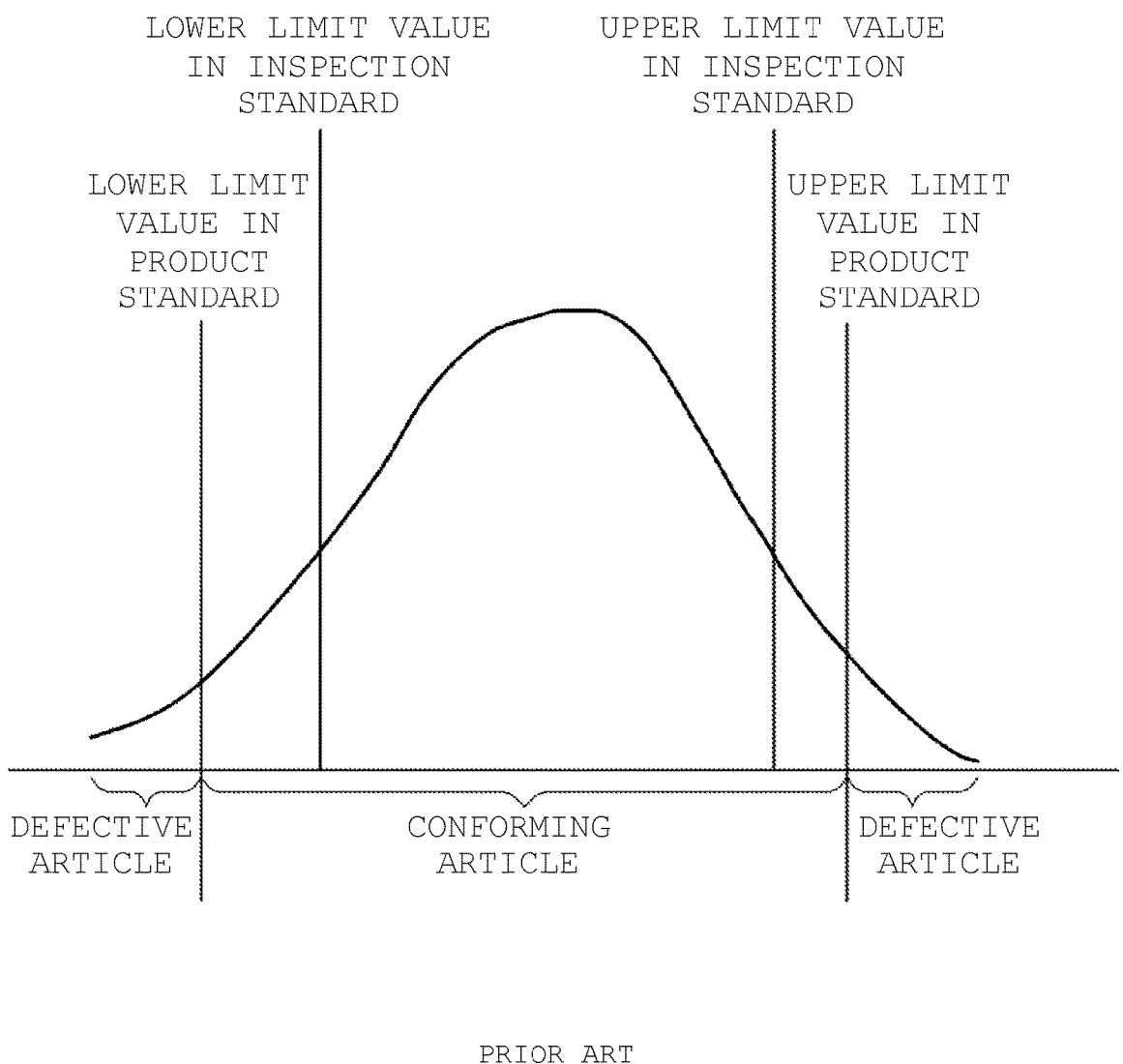
FIG. 3 is a schematic diagram showing a probability distribution which is obtained by a conventional product inspection device measuring the characteristic values of a plurality of products.

A determining unit 5 determines whether or not a product 10 is a conforming article depending on whether or not the product measurement value measured by the measuring unit 1 falls within a range from an upper limit value to a lower limit value inclusive defined in the inspection standard. FIG. 3 is a schematic diagram showing a probability distribution which is obtained by a conventional product inspection device measuring the characteristic values of a plurality of products 10. FIG. 3 shows the probability distribution of the product measurement values of the products 10 in which the horizontal axis represents the characteristic values of the products 10 and the vertical axis represents the number of the product 10. The probability distribution of the product measurement values of the measured products 10 is a normal distribution.

Further, FIG. 3 shows the upper limit value (the upper limit value of the product standard) and the lower limit value (the lower limit value of the product standard) of the characteristic values defined in the product standard. The determining unit 5 determines a product 10 falling within a range from the upper limit value to the lower limit value inclusive in the product standard as a conforming article, and a product 10 falling within a range greater than the upper limit value or a range smaller than the lower limit value in the product standard as a defective article. It is noted that FIG. 3 also shows the upper limit value (the upper limit value of the inspection standard) and the lower limit value (the lower limit value of the inspection standard) of the characteristic values defined in the inspection standard that is more rigorous in conditions than the product standard. Since the inspection standard is more rigorous in conditions than the product standard, the upper limit value of the inspection standard is smaller than the upper limit value of the product standard, and the lower limit value of the inspection standard is greater than the lower limit value of the product standard.

A risk calculating unit 6 calculates a consumer risk CR representing the probability of a product failing to satisfy the product standard being erroneously determined as a conforming article based on the product standard by the determining unit 5, and a producer risk PR representing the probability of a product satisfying the product standard being erroneously determined as a defective article based on the product standard by the determining unit 5. Specifically, the consumer risk CR and the producer risk PR can be calculated respectively by solving (Equation 2) and (Equation 3) disclosed in Non-Patent Document 2:

[Mathematic Expression 2]

$$CR = \frac{1}{2\pi} \cdot \int_{-\infty}^{-L} \int_{-R(t+k \cdot L)}^{-R(t-k \cdot L)} e^{-\frac{(t-u)^2+(s-v)^2}{2}} dsdt + \frac{1}{2\pi} \cdot \int_{L}^{\infty} \int_{-R(t+k \cdot L)}^{-R(t-k \cdot L)} e^{-\frac{(t-u)^2+(s-v)^2}{2}} dsdt \quad \text{(Equation 2)}$$

[Mathematic Expression 3]

$$PR = \frac{1}{2\pi} \cdot \int_{-L}^{L} \int_{-\infty}^{-R(t+k \cdot L)} e^{-\frac{(t-u)^2+(s-v)^2}{2}} dsdt + \frac{1}{2\pi} \cdot \int_{-L}^{L} \int_{-R(t-k \cdot L)}^{\infty} e^{-\frac{(t-u)^2+(s-v)^2}{2}} dsdt \quad \text{(Equation 3)}$$

When the probability distribution of the characteristic value variations of the products 10 and the probability distribution of the measurement variations of the measuring unit 1 are normal distribution, (Equation 2) and (Equation 3) are expressed in the form of double integral of a probability density function of the characteristic value variations in the products 10 with which the reference normal distribution is derived by the product standard deviation PV of the products 10 and a probability density function of the measurement variations with which the reference normal distribution is derived by the measurement value standard deviation GRR of the measuring unit 1. Here, t is a position from the center of the probability distribution of the characteristic value variations of the products 10; s is a position from the center of the probability distribution of the measurement variations of the measuring unit 1; L is a half-width of the product standard (when the center of the product standard of the products 10 is zero, a distance from zero to the upper limit value or the lower limit value of the product standard of the products 10); k·L is a half-width of the inspection standard (when the center of the inspection standard of the products 10 is zero, a distance from zero to the upper limit value or the lower limit value of the inspection standard of the product 10); u is a bias in the probability distribution of the characteristic value variations of the products 10; v is a bias in the probability distribution of the measurement variations of the measuring unit 1; and R is an accuracy ratio (a value obtained by dividing the product standard deviation PV of the products 10 by the measurement value standard deviation GRR of the measuring unit 1).

Since it is difficult to mathematically solve the double integral equations of (Equation 2) and (Equation 3), the product inspection device according to the present first embodiment calculates the consumer risk CR and the producer risk PR using the standard deviation of the products 10. Here, a product standard deviation calculating unit 61 calculates the product standard deviation PV from (Equation 1) using the deemed standard deviation TV and the measurement value standard deviation GRR. A risk deriving unit 62 divides the probability distribution of the calculated product standard deviation PV into a plurality of zones. Then, assuming that the probability distribution in each zone follows the probability distribution of the measurement value standard deviation GRR, the risk deriving unit 62 calculates, as the consumer risk CR, the probability of a product 10, despite its product measurement value belonging to a zone of a range greater than the upper limit value defined in the product standard or a range smaller than the lower limit value, being erroneously determined as a product whose product measurement value belongs to a zone satisfying the product standard (a conforming article); and calculates, as the producer risk PR, the probability of a product 10, despite its product measurement value belonging to a zone of a range from the upper limit value to the lower limit value inclusive defined in the product standard, being erroneously determined as a product whose product measurement value belongs to a zone failing to satisfy the product standard (a defective article).

Figure 4:
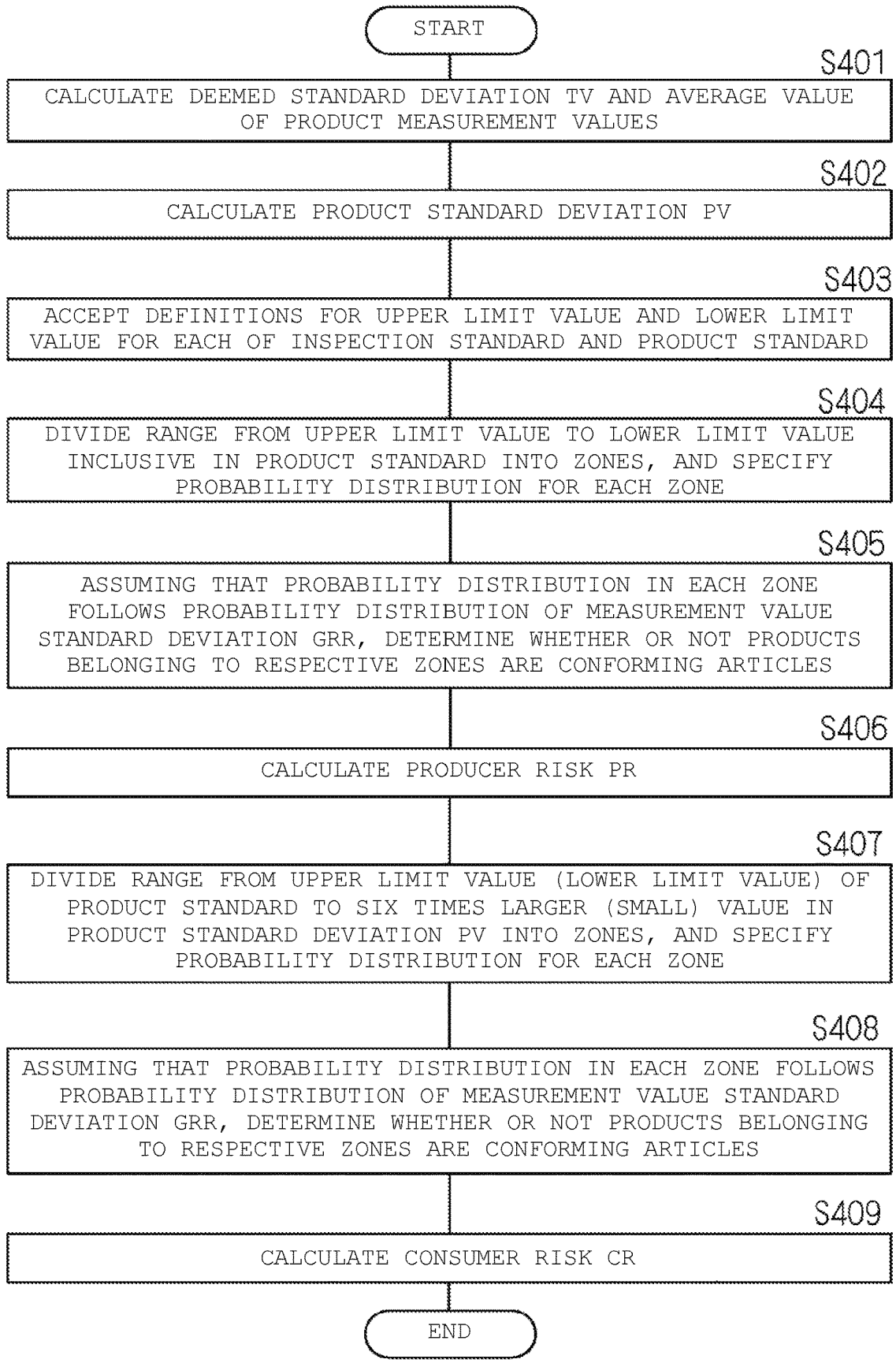
FIG. 4 is a flowchart showing the processing procedure executed by a risk calculating unit of the conventional product inspection device to calculate a consumer risk and a producer risk.

FIG. 4 is a flowchart showing the processing procedure executed by the risk calculating unit 6 of the product inspection device according to the first embodiment to calculate the consumer risk CR and the producer risk PR.

The CPU 21 of the calculation processing unit 2 calculates the deemed standard deviation TV and the average value of the product measurement values from the product measurement values of part of the products 10 contained in the product lot 11 measured by the measuring unit 1 and received through the measurement interface 27 (step S401); and substitutes the calculated deemed standard deviation TV and the measurement value standard deviation GRR into (Equation 1), to calculate the product standard deviation PV (step S402). The CPU 21 accepts the definitions for the upper limit value and the lower limit value for each of the inspection standard and the product standard (step S403).

Assuming that the probability distribution of the calculated product standard deviation PV is the normal distribution, the CPU 21 then divides the range from the upper limit value to the lower limit value inclusive in the product standard of the probability distribution into 200 zones, and specifies the probability distribution for each zone (step S404). Assuming that the probability distribution in each zone follows the probability distribution of the measurement value standard deviation GRR, the CPU 21 determines whether or not the products 10 belonging to respective zones are conforming articles based on the inspection standard (step S405). The CPU 21 calculates, as the producer risk PR, the probability of a product 10, which belongs to a range from the upper limit value to the lower limit value inclusive in the product standard, being determined in step S405 as a product 10 belonging to a range greater than the upper limit value in the inspection standard or to a range smaller than the lower limit value in the inspection standard (step S406).

Figure 5:
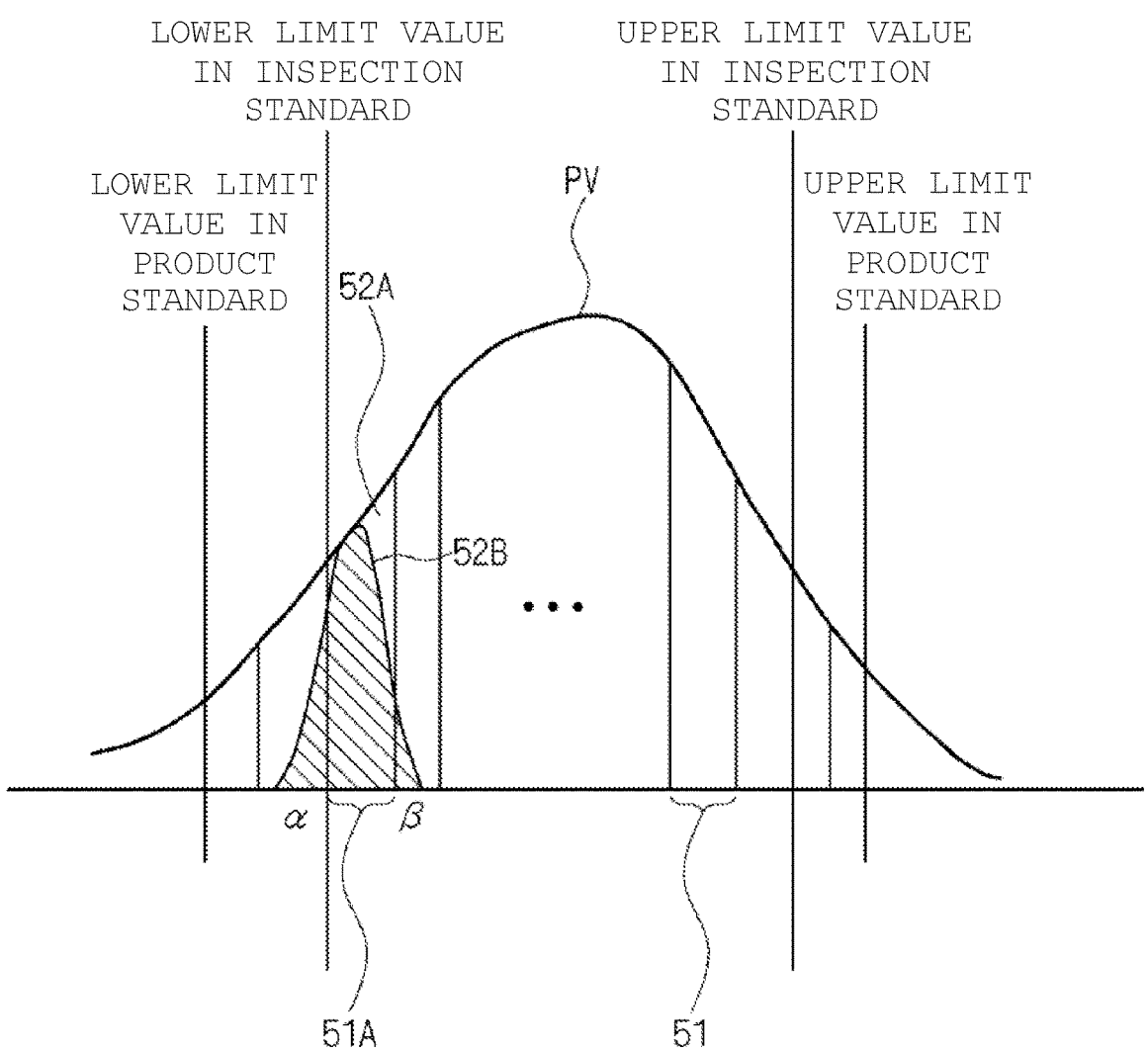
FIG. 5 is a schematic diagram showing a state where a probability distribution in each zone of a probability distribution of the product standard deviation follows a probability distribution of a measurement value standard deviation.

Here, with reference to the drawing, a description will be given of the assumption that the probability distribution in each zone follows the probability distribution of the measurement value standard deviation GRR. FIG. 5 is a schematic diagram showing a state where the probability distribution in each zone of the product standard deviation PV follows the probability distribution of the measurement value standard deviation GRR. As shown in FIG. 5, the probability distribution of the product standard deviation PV has its range from the upper limit value to the lower limit value inclusive in the product standard divided into 200 pieces of zones 51. For example, in a zone 51A covering the range from a characteristic value $\alpha$ to a characteristic value $\beta$ inclusive, a product 10 whose characteristic value falls within a range from the characteristic value $\alpha$ to the characteristic value $\beta$ exists, whereas a product 10 whose characteristic value is smaller than the characteristic value $\alpha$ or greater than the characteristic value $\beta$ does not exist. Assuming that a probability distribution 52A of the zone 51A after measurement follows the probability distribution of the measurement value standard deviation GRR, the product measurement values of respective products 10 belonging to the zone 51A will have the measurement variations, and hence the probability distribution 52A of the zone 51A can be deemed to be an assumed probability distribution 52B. In the assumed probability distribution 52B, a product 10 whose characteristic value is smaller than the characteristic value $\alpha$ or greater than the characteristic value $\beta$ also exists. The CPU 21 determines whether or not the products 10 belonging to their respective zones 51 are conforming articles based on the inspection standard, regarding that the probability distribution in each zone 51 is the assumed probability distribution. A product 10 belonging to any zone 51 that is determined as a defective article based on the inspection standard is a product 10 that is determined as a defective article based on the inspection standard despite its satisfying the product standard. Thus, the probability of being determined as such a defective product 10 in this manner can be calculated as the producer risk PR.

Referring again to FIG. 4, the CPU 21 of the calculation processing unit 2 divides the range from the upper limit value (the lower limit value) of the product standard to a six times larger (smaller) value in the product standard deviation PV into 200 zones based on the assumption that the probability distribution of the calculated product standard deviation PV is the normal distribution, and specifies the probability distribution for each zone (step S407). Assuming that the probability distribution in each zone after measurement follows the probability distribution of the measurement value standard deviation GRR as shown in FIG. 5, the CPU 21 determines whether or not the products 10 belonging to respective zones are conforming articles based on the inspection standard (step S408). The CPU 21 calculates, as the consumer risk CR, the probability of a product 10 being determined as belonging to a range from the upper limit value to the lower limit value inclusive in the inspection standard in step S408 (step S409).

It is noted that the calculated consumer risk CR and the producer risk PR can be represented by %, ppm (parts per million), or ppb (parts per billion).

In the case where the consumer risk CR and the producer risk PR are calculated by the conventional method described above, the distribution of the product measurement values of the products 10 must be previously known. Further, the conventional method is based on the premise that the distribution of the product measurement values of the products 10 substantially agrees with, or is substantially identical to any well-known distribution such as the normal distribution and, therefore, the conventional method unfortunately incurs increased calculation errors when the distribution of the product measurement values of the products 10 largely deviates from any well-known distribution.

Accordingly, in the first embodiment, focusing attention on the fact that the actually measured product measurement values are hardly identical, a final consumer risk and a final producer risk are calculated by: adding up the consumer risk and the producer risk calculated for each of the product measurement values obtained by measuring products 10; and calculating the average value of the added up values for each of the consumer risk and the producer risk.

Figure 6:
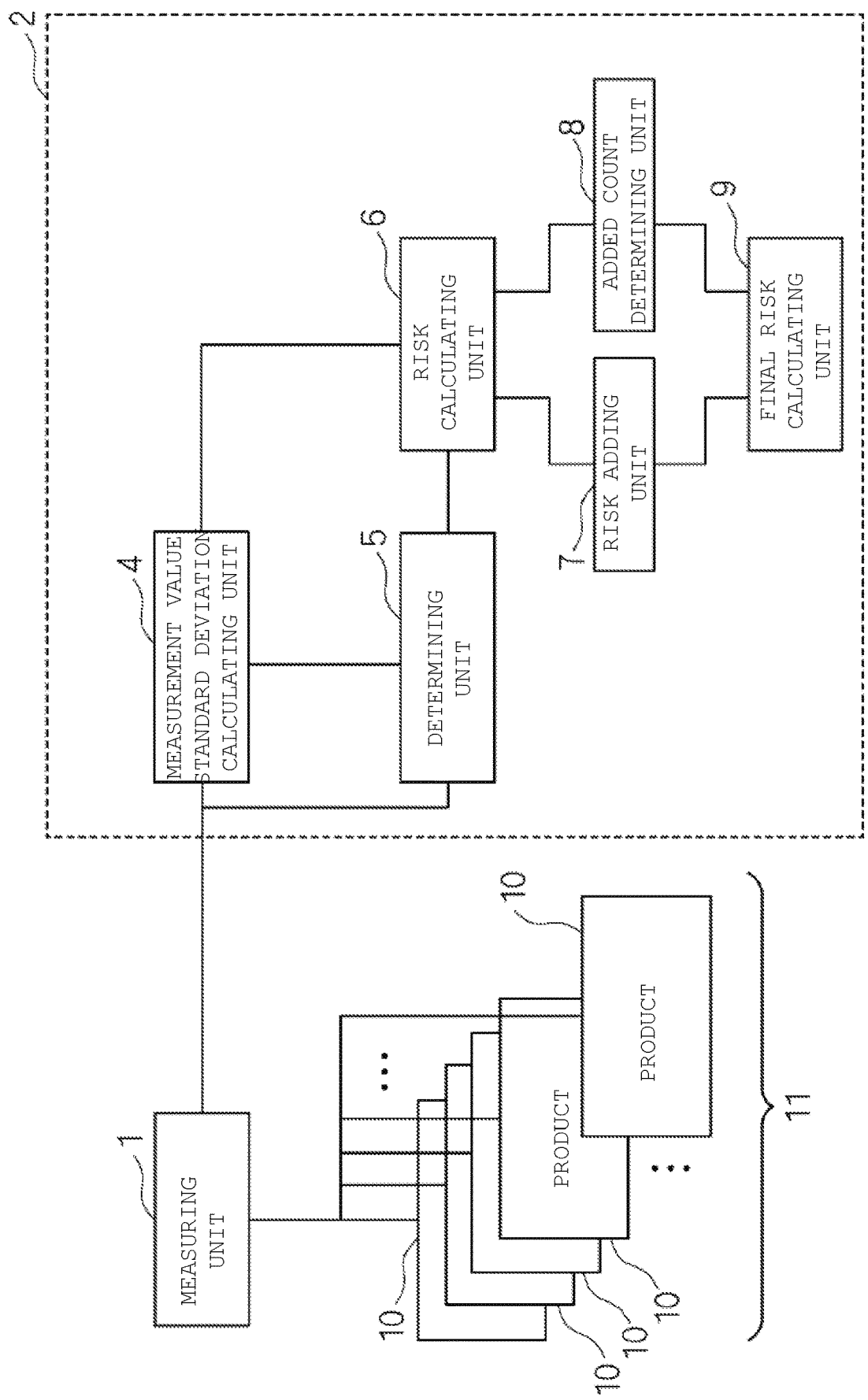
FIG. 6 is a functional block diagram of the product inspection device according to the first exemplary embodiment.

FIG. 6 is a functional block diagram of the product inspection device according to the first embodiment. In FIG. 6, the measuring unit 1 measures, as the product measurement value, a characteristic value representing a predetermined characteristic of each of the products 10. While the product lot 11 consists of a predetermined number of products 10 as one unit, in the first embodiment, the following process is performed for each of the products 10.

Before measuring the product lot 11, the measurement value standard deviation calculating unit 4 previously calculates, as a measurement value standard deviation by a predetermined method, a standard deviation of measurement variations which represents variations in the product measurement values. The method of calculating the standard deviation of measurement variations may be, for example, a scheme of evaluating uncertainty, or Measurement system analysis MSA (Measurement Systems Analysis) defined in Particular requirements (ISO/TS 16949) for automotive production and relevant service part organizations of Quality management systems (ISO 9001:2000) of the ISO standards.

The determining unit 5 determines whether or not the product measurement value measured by the measuring unit 1 for each product 10 falls within a range from an upper limit value to a lower limit value inclusive, which upper and lower limit values are defined with reference to the product standard defining the upper and lower limit values of the characteristic values determining conformity/defectiveness of the products 10, thereby determining whether or not the product 10 is a conforming article.

The risk calculating unit 6 calculates the consumer risk CR representing the probability of a product failing to satisfy the product standard being erroneously determined as a conforming article by the determining unit 5, and the producer risk PR representing the probability of a product satisfying the product standard being erroneously determined as a defective article by the determining unit 5. Specifically, the consumer risk CR and the producer risk PR are calculated according to the method described above.

A risk adding unit 7 respectively and successively adds up the consumer risk CR and the producer risk PR calculated for each product 10. Simultaneously, the risk adding unit 7 counts the number of products having undergone the adding, using a counter or the like. An added count determining unit 8 determines whether or not the number of products having undergone the adding has reached a predetermined number of products.

When the added count determining unit 8 determines that the number of products having undergone the adding has reached a predetermined number of products, a final risk calculating unit 9 divides the added up consumer risk CR and the added up producer risk PR by the number of products, to calculate a final consumer risk FCR and a final producer risk FPR.

Figure 7:
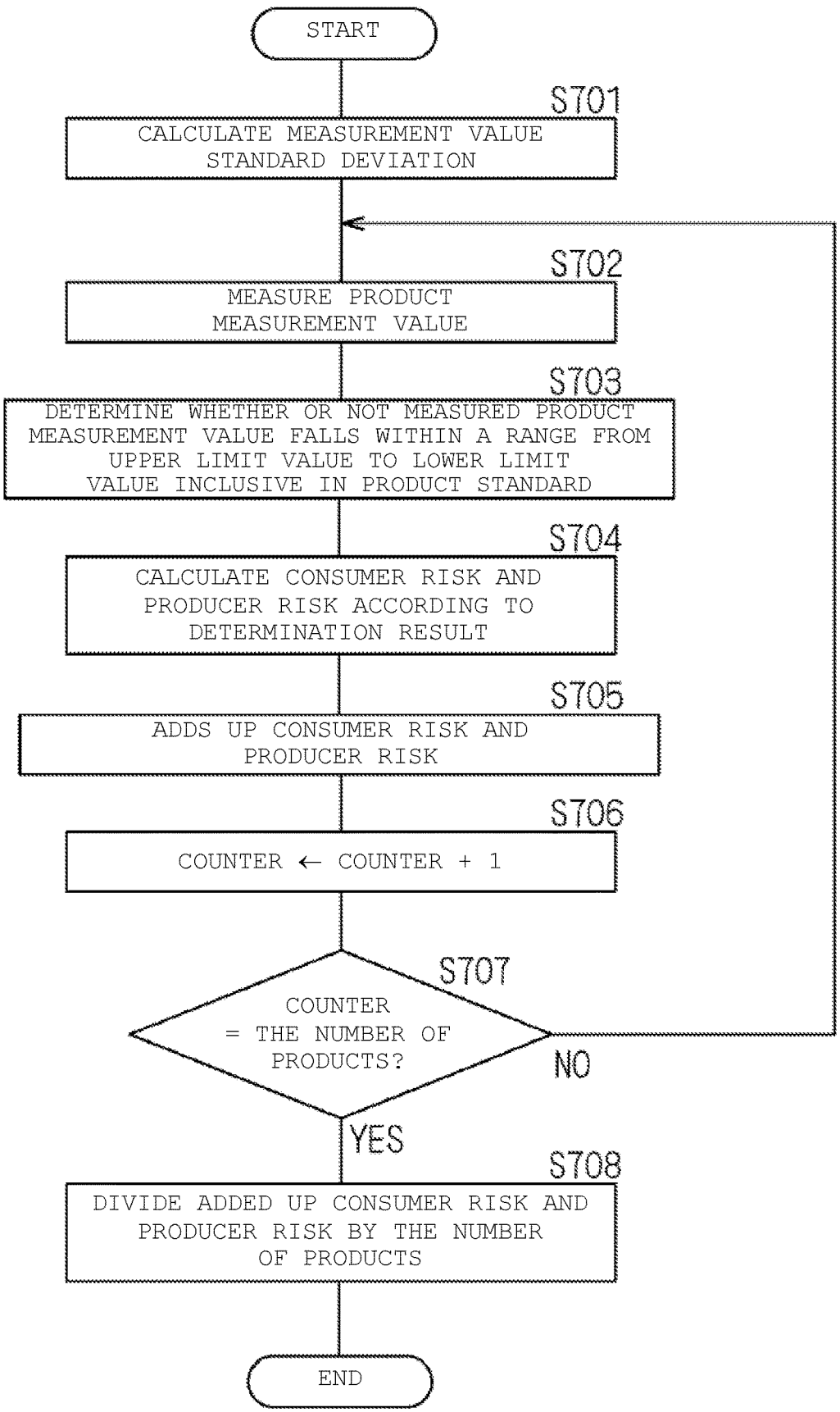
FIG. 7 is a flowchart showing the processing procedure executed in the product inspection device according to the first exemplary embodiment.
Figure 8:
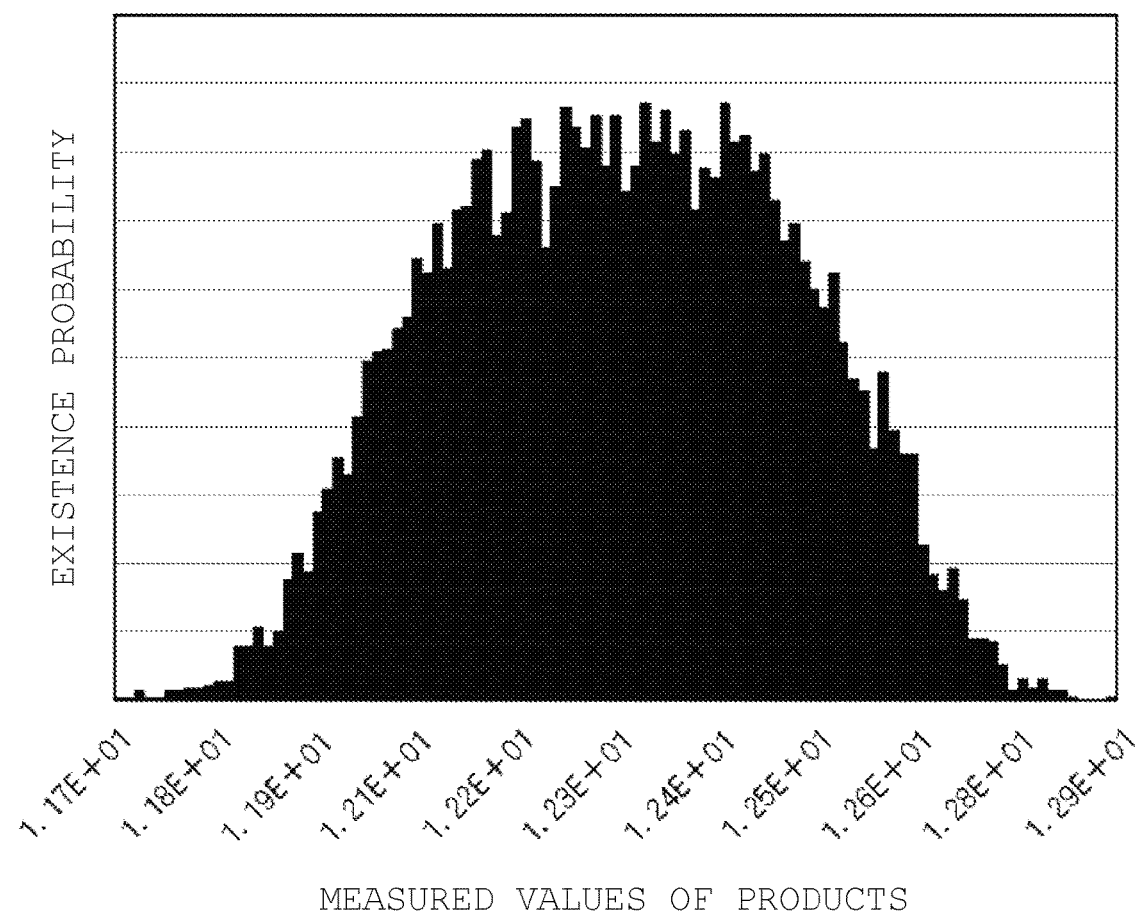
FIG. 8 exemplarily shows a non-specific distribution of the products used in the product inspection device according to the first exemplary embodiment.

Specifically, with reference to a flowchart, a description will be given of the processing procedure of calculating the consumer risk and the producer risk in the product inspection device according to the first embodiment. FIG. 7 is a flowchart showing the processing procedure executed in the product inspection device according to the first embodiment. FIG. 8 exemplarily shows a non-specific distribution of the product measurement values of the products 10 used in the product inspection device according to the first exemplary embodiment.

In FIG. 7, the CPU 21 of the calculation processing unit 2 calculates, as a measurement value standard deviation by a predetermined method, a measurement variation standard deviation $\sigma_{GRR}$ representing variations in the product measurement values (step S701). Here, it is based on the premise that the measurement variations show a normal distribution of standard deviation. The CPU 21 measures, as the product measurement value, the characteristic value representing the predetermined characteristic for each product 10 (step S702).

The CPU 21 determines whether or not the product measurement value measured for each product 10 falls within a range from the upper limit value to the lower limit value inclusive, which upper and lower limit values are defined with reference to the product standard defining the upper and lower limit values of the characteristic values determining conformity/defectiveness of the product 10 (step S703). According to the determination result, the CPU 21 calculates the consumer risk CR and the producer risk PR for each product (step S704).

Figure 9:
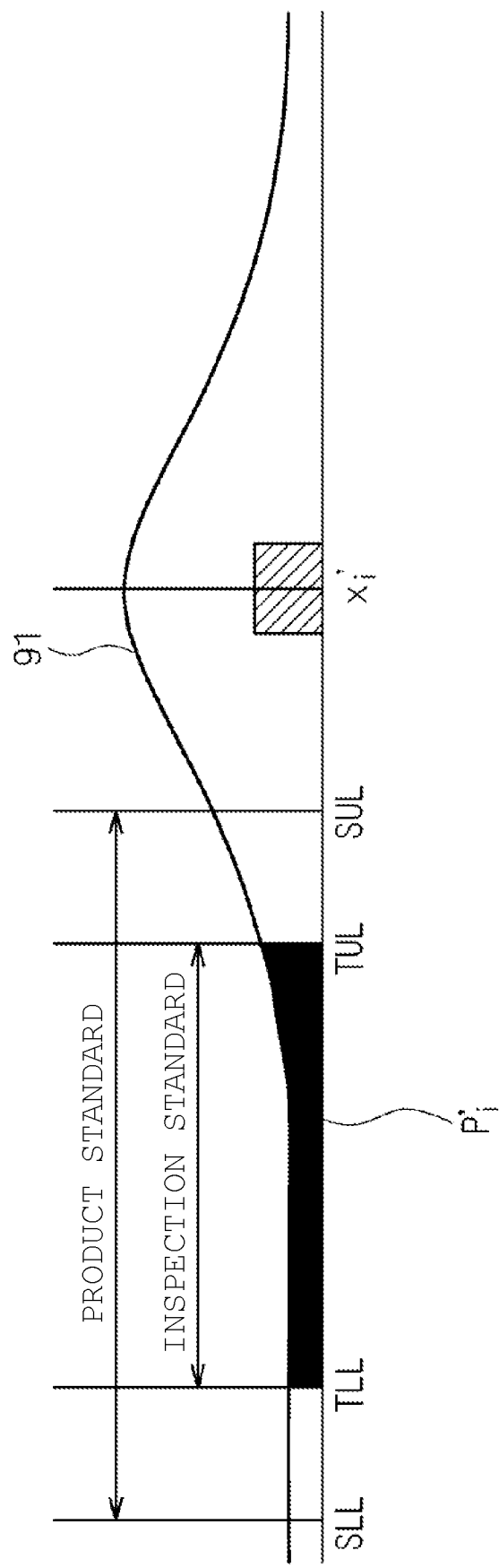
FIG. 9 is a schematic diagram showing a method of calculating the consumer risk in the product inspection device according to the first exemplary embodiment.
Figure 10:
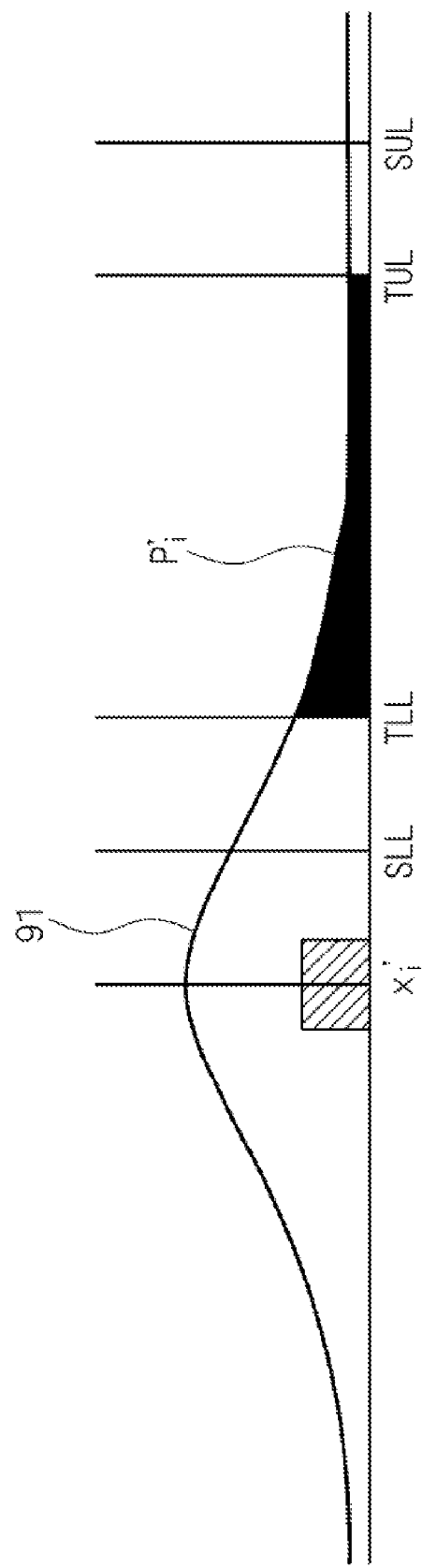
FIG. 10 is a schematic diagram showing a method of calculating the consumer risk in the product inspection device according to the first exemplary embodiment.

FIGS. 9 and 10 are each a schematic diagram showing a method of calculating the consumer risk CR in the product inspection device according to the first embodiment. FIG. 9 shows the state where a product estimated value $x_i'$ of the measured product 10 is greater than the upper limit value of the product standard. FIG. 10 shows the state where the product estimated value $x_i'$ of the relevant product 10 is smaller than the lower limit value of the product standard. Here, the product estimated value $x_i'$ means the estimation value which is deemed to be the true value obtained by subtracting measurement variations from a product measurement value $x_i$.

In FIG. 9, a normal distribution 91 of a measurement variation standard deviation $\sigma_{GRR}$ is horizontally symmetric relative to the product estimated value $x_i'$, with the product estimated value $x_i'$ being greater than an upper limit value TUL in the inspection standard. In this case, a probability $P_i'$ of satisfying the inspection standard can be expressed by (Equation 4):

[Mathematic Expression 4]

$$P_i'=\text{Normsdist}((x_i'-TLL)/\sigma_{GRR})-\text{Normsdist}((x_i'-TUL)/\sigma_{GRR}) \quad \text{(Equation 4)}$$

Accordingly, the final consumer risk FCR of the product estimated value $x_i'$ can be calculated by (probability $P_i'/n$) where n is the number of products (n is a natural number).

Similarly, in FIG. 10, the normal distribution 91 of the measurement variation standard deviation $\sigma_{GRR}$ is horizontally symmetric relative to the product estimated value $x_i'$, with the product estimated value $x_i'$ being smaller than a lower limit value TLL in the inspection standard. In this case, the probability $P_i'$ of satisfying the inspection standard can be expressed by (Equation 5):

[Mathematic Expression 5]

$$P_i'=\text{Normsdist}((TUL-x_i')/\sigma_{GRR})-\text{Normsdist}((TLL-x_i')/\sigma_{GRR}) \quad \text{(Equation 5)}$$

Accordingly, similarly, the final consumer risk FCR of the product estimated value $x_i'$ can be calculated by (probability $P_i'/n$) where n is the number of products (n is a natural number).

Figure 11:
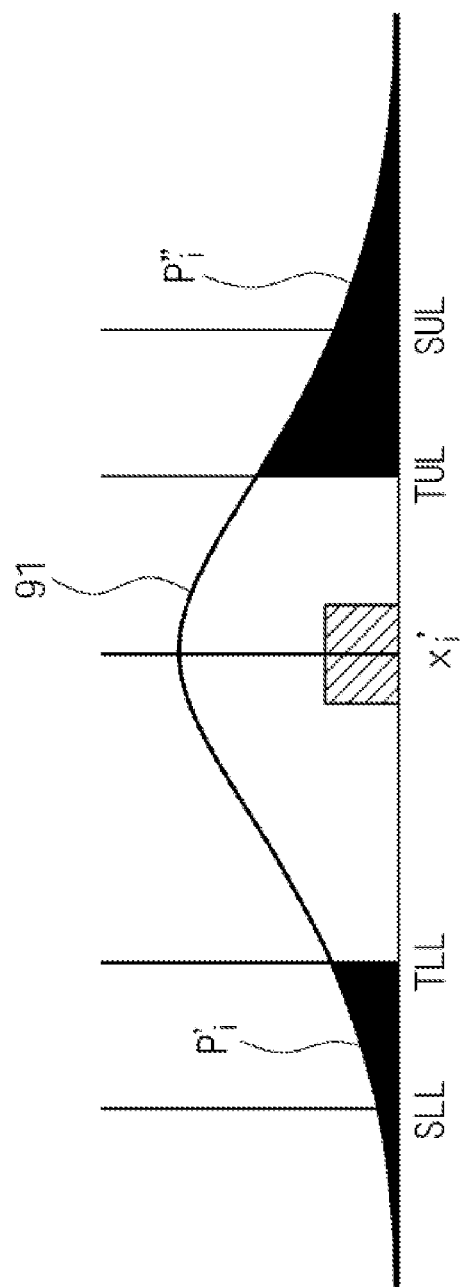
FIG. 11 is a schematic diagram showing a method of calculating the producer risk in the product inspection device according to the first exemplary embodiment.

FIG. 11 is a schematic diagram showing a method of calculating the producer risk PR in the product inspection device according to the first embodiment. In FIG. 11, when the product estimated value $x_i'$ of the measured product 10 falls within a range from the lower limit value to the upper limit value inclusive in the product standard, the producer risk PR may occur.

Accordingly, as shown in FIG. 11, when the product estimated value $x_i'$ falls within a range from the lower limit value to the upper limit value inclusive in the inspection standard, the final producer risk FPR is calculated according to (Equation 6) using the sum of the probability $P_i'$ being smaller than the lower limit value in the inspection standard and a probability $P_i''$ being greater than the upper limit value in the inspection standard:

[Mathematical Expression 6]

$$FPR=\{\text{Normsdist}((TLL-x_i')/\sigma_{GRR})+1-\text{Normsdist}((TUL-x_i')/\sigma_{GRR})\}/n \quad \text{(Equation 6)}$$

Referring again to FIG. 7, the CPU 21 respectively and successively adds up the consumer risk and the producer risk calculated for each product 10 (step S705), while incrementing the counter by '1' for each time (step S706). The CPU 21 determines whether or not the counter has reached the number of products (step S707).

When the CPU 21 determines that the counter has not reached the number of products (step S707: NO), the CPU 21 returns the processing step to step S702, and repeats the operations described above. When the CPU 21 determines that the counter has reached the number of products (step S707: YES), the CPU 21 divides the added up consumer risk and the added up producer risk by the number of products, to calculate the final consumer risk and the final producer risk (step S708).

That is, the (final) consumer risk of a product lot is obtained by adding up the consumer risk having the characteristic value not satisfying the product standard obtained for each of the whole products of the product lot. Thus, independently of the distribution of the characteristic values, the (final) consumer risk can be obtained at high accuracy.

For example, with the upper limit value SUL in the product standard=12.5, the lower limit value SLL in the product standard=11.5, the upper limit value TUL in the inspection standard=12.4, the lower limit value TLL in the inspection standard=11.6, the product measurement value $x_i$ (i=1 to 10000), the average value $x_{bar}$ of the product measurement values=12.30141, and the measurement variations $\sigma_{GRR}$=0.04000, the (final) consumer risk (F)CR and the (final) producer risk (F)PR are calculated based on the conventional method, the method according to the first embodiment, and the true value, to obtain the conforming article rate for each case.

FIG. 12 is a table showing the calculation accuracy of the conforming article rate with the product inspection device according to the first embodiment. In FIG. 12, the data calculated according to the conventional method is obtained setting the standard deviation of the characteristic values of the products to 0.20000.

As shown in FIG. 12, while the true value of the conforming article rate to be obtained is 65.93252%, the conforming article rate calculated by the conventional method is 68.76411%, largely deviating from the true value. Contrarily, the conforming article rate calculated by the method according to the first embodiment is 65.7614%, which is extremely close to the true value.

As has been described above, with the product inspection device according to the first embodiment, the consumer risk CR and the producer risk PR for each of the whole products are respectively added up and divided by the number of products, thereby obtaining the final consumer risk FCR and the final producer risk FPR. That is, the consumer risk (F)CR and the producer risk (F)PR can be calculated independently of the product distribution, whereby accuracy in determining the conforming articles improves.

Second Embodiment

A product inspection device according to a second embodiment is configured similarly to the product inspection device according to the first embodiment and, therefore, the elements are denoted by identical reference characters and a detailed description thereof will not be repeated. The second embodiment is different from the first embodiment in that the consumer risk CR and the producer risk PR are calculated based on a product estimated value obtained by eliminating a measurement variations variance $(\sigma_{GRR})^2$ from each of the measured product measurement values.

Figure 13:
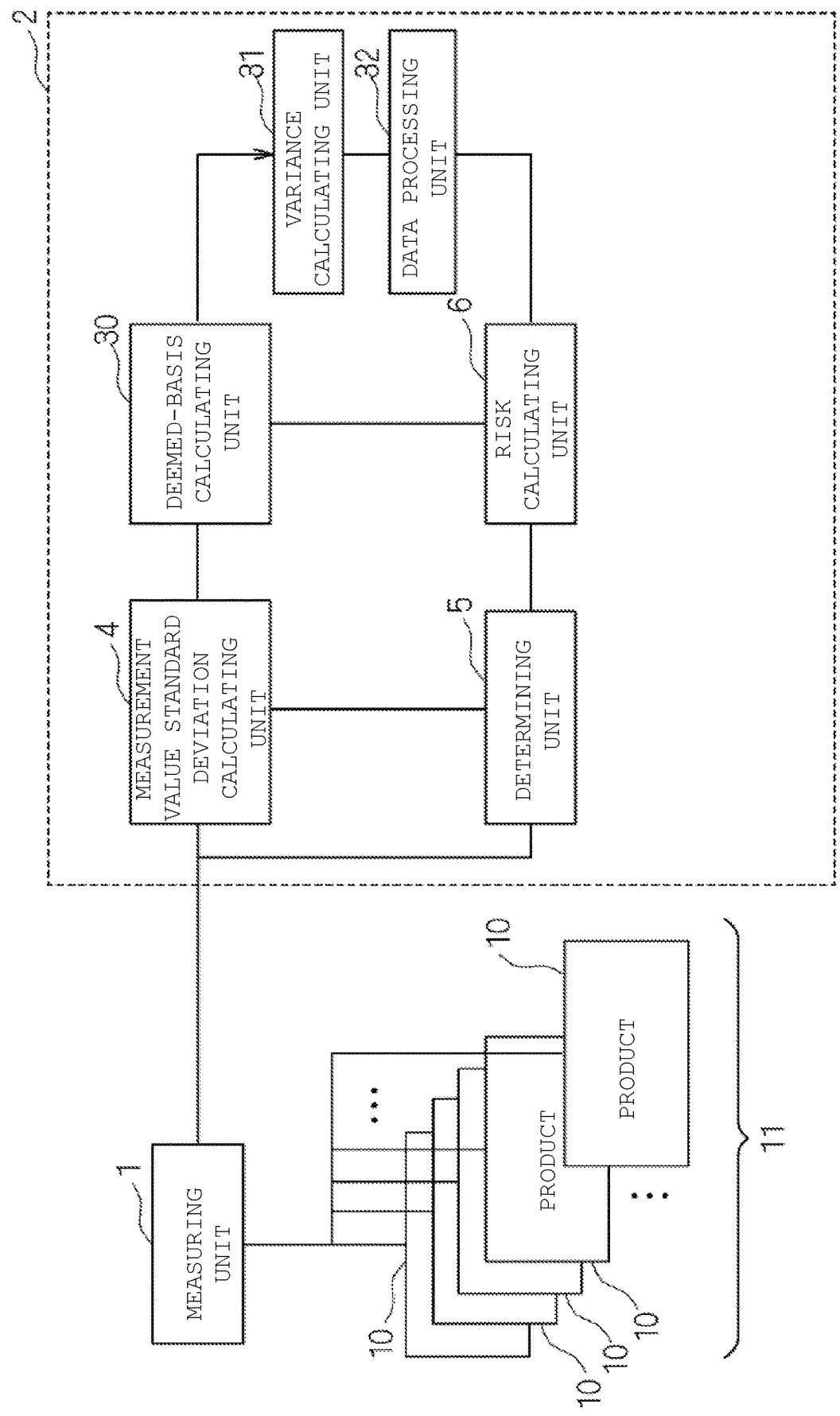
FIG. 13 is a functional block diagram of a product inspection device according to a second exemplary.

FIG. 13 is a functional block diagram of the product inspection device according to the second embodiment. A deemed-basis calculating unit 30 calculates: the average value of the product measurement values of part of the products 10 contained in the product lot 11 as a deemed average value; and the standard deviation of variations in the product measurement values as a deemed standard deviation. For example, when the product lot 11 consists of 100,000 pieces of products 10, the measuring unit 1 samples 10,000 pieces of products 10 out of the product lot 11 and measures the product measurement values of the products 10. The deemed-basis calculating unit 30 calculates the average value of the product measurement values as the deemed average value, and the standard deviation of the variations in the product measurement values as the deemed standard deviation.

For example, an average value $x_{bar}$ of the product measurement values and a standard deviation $\sigma_{TV}$ for individual products can be calculated by (Equation 7) and (Equation 8). In (Equation 7) and (Equation 8), n is the number of products.

[Mathematical Expression 7]

$$Xbar = \frac{x_1 + x_2 + \ldots + x_n}{n} \quad \text{(Equation 7)}$$

-continued $$\sigma_{TV} = \sqrt{\frac{\sum_{i=1}^{n}(x_i - Xbar)^2}{n-1}} \quad \text{(Equation 8)}$$

The variance calculating unit 31 calculates a measurement variations variance based on the calculated deemed average value, and a deemed variance based on the calculated deemed standard deviation. A data processing unit 32 calculates a product estimated value by adding, to the calculated deemed average value, a value obtained by multiplying a square root of (1−the measurement variations variance/the deemed variance) by the deviation of the product measurement values.

Specifically, the deemed variance $(\sigma_{TV})^2$ is calculated by raising the deemed standard deviation $\sigma_{TV}$ to the second power, and the measurement variations variance $(\sigma_{GRR})^2$ is calculated based on the deemed average value $x_{bar}$. Using the deemed variance $(\sigma_{TV})^2$ and the measurement variations variance $(\sigma_{GRR})^2$, a product estimated value $x_i'$ is calculated by adding, to the deemed average value $x_{bar}$, a value obtained by multiplying a square root of (1−the measurement variations variance/the deemed variance) by a deviation of the product measurement values. For example, for a product measurement value $x_i$, a product estimated value $x_i'$ is calculated based on (Equation 9):

[Mathematical Expression 8]

$$x_i' = Xbar + \sqrt{\left(1 - \frac{\sigma_{GRR}^2}{\sigma_{TV}^2}\right)}(x_i - Xbar) \quad \text{(Equation 9)}$$

Figure 14:
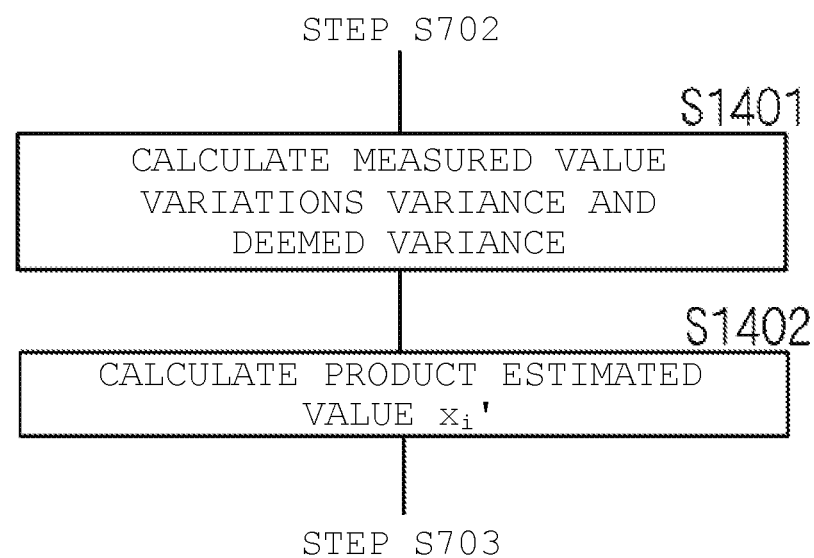
FIG. 14 is a flowchart showing the procedure of calculating the product estimated value in the product inspection device according to the second exemplary embodiment.

By calculating the consumer risk CR and the producer risk PR for each product using the calculated product estimated value $x_i'$, and calculating the average value for each of the consumer risk CR and the producer risk PR, whether the products are conforming or defective is determined at higher accuracy. FIG. 14 is a flowchart showing the procedure of calculating the product estimated value in the product inspection device according to the second embodiment. It is noted that, similarly to the first embodiment, distribution of the product measurement values of the products 10 is a non-specific distribution such as shown in FIG. 8.

In FIG. 14, similarly in FIG. 7, the CPU 21 of the calculation processing unit 2 calculates, as a measurement value standard deviation by a predetermined method, a measurement variation standard deviation representing variations in the product measurement values (step S701). Here, it is based on the premise that the measurement variations show a normal distribution of standard deviation. The CPU 21 measures, as the product measurement value, the characteristic value representing the predetermined characteristic for each product 10 (step S702).

The CPU 21 calculates a measurement variations variance based on the calculated deemed average value, and a deemed variance based on the calculated deemed standard deviation (step S1401). The CPU 21 calculates a product estimated value $x_i'$ by adding, to the calculated deemed average value $x_{bar}$, a value obtained by multiplying a square root of (1−the measurement variations variance/the deemed variance) by a deviation of the product measurement values $x_i$ (step S1402). By performing operations in step S703 and the following steps in FIG. 7, the CPU 21 divides the added up consumer risk and the added up producer risk by the number of products, to calculate the final consumer risk and the final producer risk.

For example, with the upper limit value SUL in the product standard=12.5, the lower limit value SLL in the product standard=11.5, the upper limit value TUL in the inspection standard=12.4, the lower limit value TLL in the inspection standard=11.6, the product measurement value $x_i$ (i=1 to 10000), the average value $x_{bar}$ of the product measurement values=12.3, and the measurement variation standard deviation $\sigma_{GRR}$=0.04000, the (final) consumer risk (F)CR and the (final) producer risk (F)PR are calculated based on the conventional method, the method according to the second embodiment, and the true value, to obtain the conforming article rate for each case.

FIG. 15 is a table showing the calculation accuracy of the conforming article rate with the product inspection device according to the second embodiment. In FIG. 15, the data calculated according to the conventional method is obtained setting the standard deviation of the characteristic values of the products to 0.20000.

As shown in FIG. 15, while the true value of the conforming article rate to be obtained is 65.93252%, the conforming article rate calculated by the conventional method is 68.76411%, largely deviating from the true value. Contrarily, the conforming article rate calculated by the method according to the second embodiment is 66.07605%, which is closer to the true value than the conforming article rate according to the first embodiment.

As has been described above, with the product inspection device according to the second embodiment, after excluding the component of the measurement variations from the product measurement values themselves, the consumer risk CR and the producer risk PR for each of the whole products are respectively added up and divided by the number of products, thereby obtaining the final consumer risk FCR and the final producer risk FPR. That is, the consumer risk (F)CR and the producer risk (F)PR can be calculated independently of the product distribution, whereby accuracy in determining the conforming articles improves.

Third Embodiment

A product inspection device according to a third embodiment is configured similarly to the product inspection device according to the first embodiment and, therefore, the elements are denoted by identical reference characters and a detailed description thereof will not be repeated.

The third embodiment is different from the first embodiment in that the measurement variation standard deviation $\sigma_{GRR}$ is estimated at high accuracy.

Figure 16:
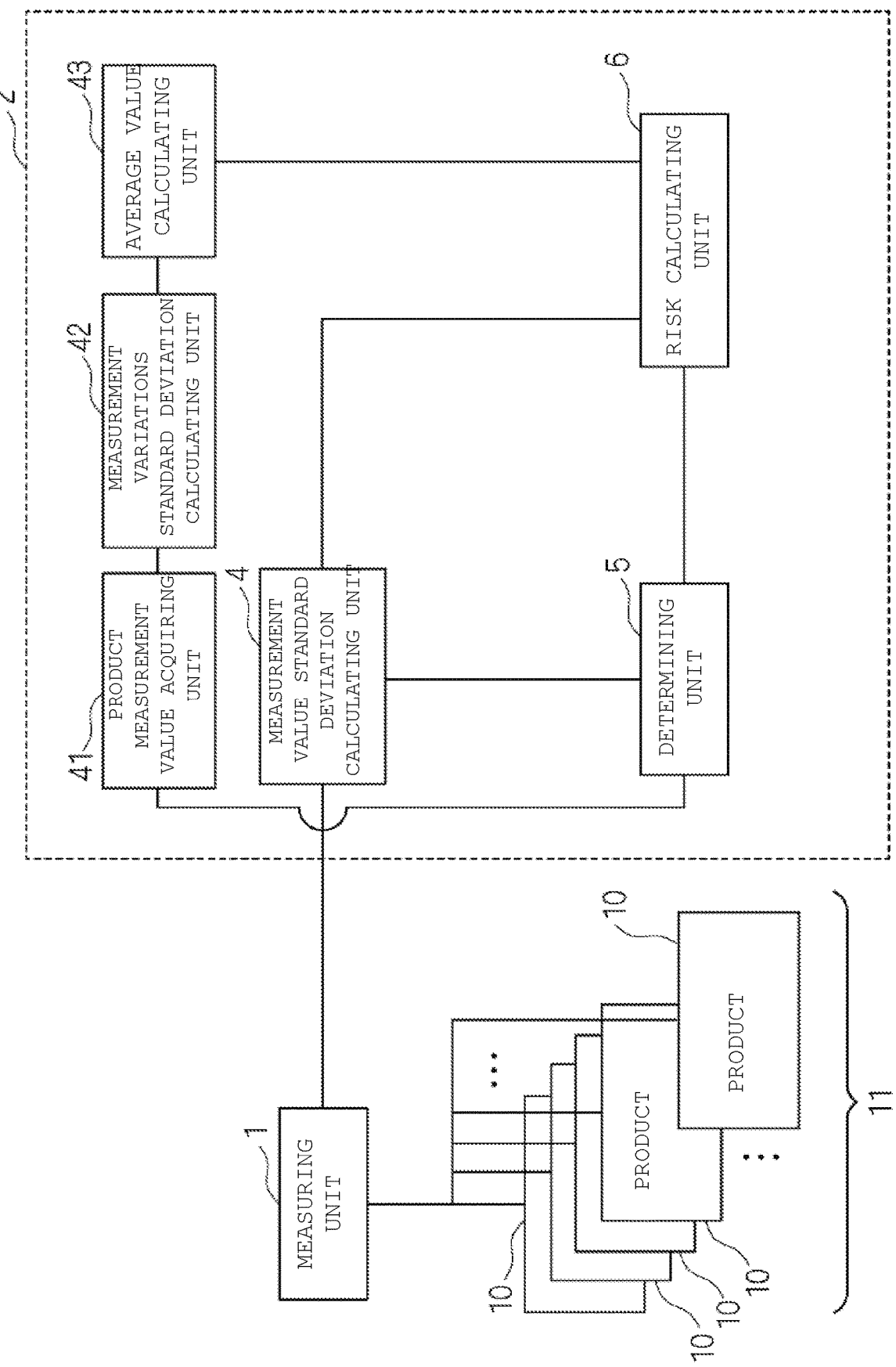
FIG. 16 is a functional block diagram of a product inspection device according to a third exemplary embodiment.

FIG. 16 is a functional block diagram of the product inspection device according to the third embodiment. A product measurement value acquiring unit 41 acquires, for a plurality of times, product measurement values relating to a certain number of products upon starting a screening of a product lot. A measurement variations standard deviation calculating unit 42 calculates a standard deviation of measurement variations for each product.

An average value calculating unit 43 calculates the consumer risk CR and the producer risk PR by calculating the average value of the calculated standard deviation of measurement variations and using the average value as the estimated standard deviation of measurement variations of the whole products.

Figure 17:
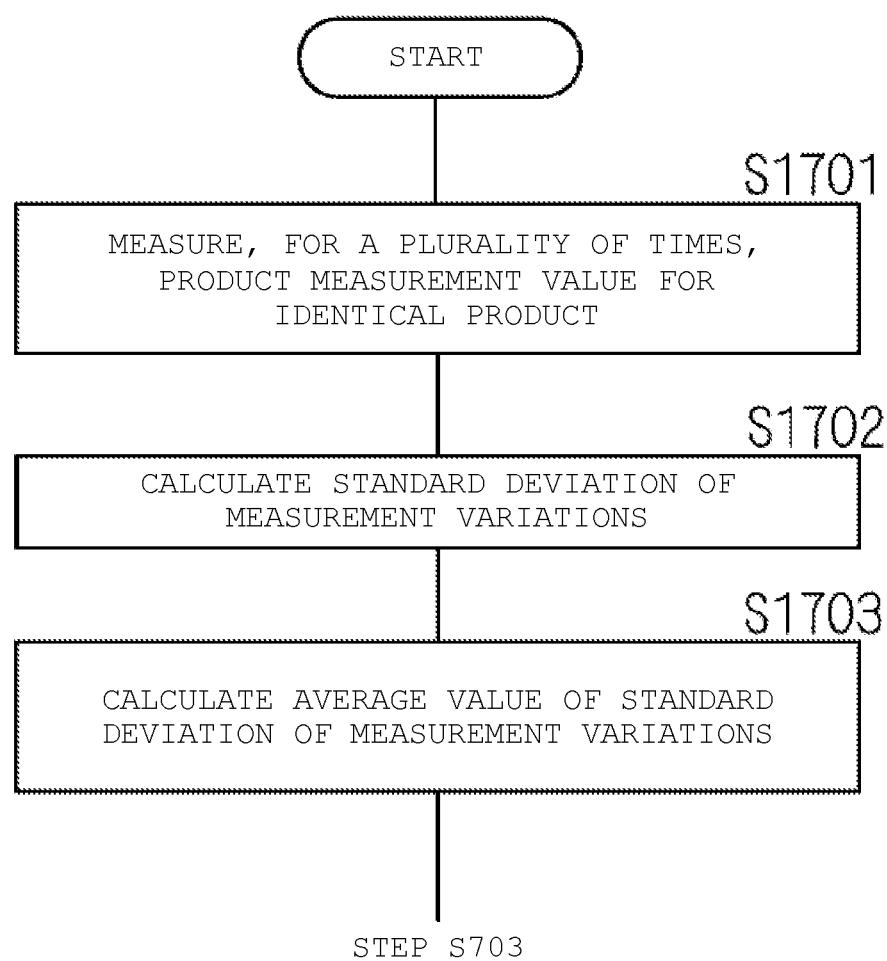
FIG. 17 is a flowchart showing the procedure of calculating an estimated standard deviation in the product inspection device according to the third exemplary embodiment.

FIG. 17 is a flowchart showing the procedure of calculating the estimated standard deviation of measurement variations in the product inspection device according to the third embodiment. It is noted that, similarly to the first embodiment, distribution of the measured values of the products 10 is a non-specific distribution such as shown in FIG. 8.

In FIG. 17, the CPU 21 of the calculation processing unit 2 measures, for a plurality of times, the product measurement values representing the predetermined characteristic for each product 10 (step S1701). The CPU 21 calculates the standard deviation of measurement variations for each product 10 (step S1702), and calculates the average value of the calculated standard deviation of measurement variations as the estimated measurement variation standard deviation $\sigma_{GRR}$ (step S1703). Using the estimated measurement variation standard deviation $\sigma_{GRR}$, the CPU 21 repeats the operations in step S703 and following steps in FIG. 7, to calculate the consumer risk CR and the producer risk PR.

Specifically, with the assumption that the upper limit value in the product standard SUL=12.5, the lower limit value in the product standard SLL=11.5, the product measurement value $x_i$ (i=1 to 1000), the average value of the product measurement values $x_{bar}$=12.1, and the number of products n=1000, the product measurement value for each product is measured twice successively. Then, the measurement variation standard deviation of the first time and the measurement variation standard deviation of the second time are calculated for each product, to calculate the estimated measurement variation standard deviation $\sigma_{GRR}$.

For example, when the product measurement value measured for the first time is 12.14578, and the product measurement value measured for the second time is 12.12863, a measurement variation standard deviation $\sigma_{GRRi}$ of the product can be obtained by dividing the difference between the first and second product measurement values by a coefficient for calculating the standard deviation. In this case, the measurement variation standard deviation $\sigma_{GRRi}$ can be obtained as follows: (12.14578−12.12863)/1.128=0.01521. Here, 1.128 is the value of $d_2$ in $d_2$* table of MSA (Measurement System Analysis).

Then, the measurement variation standard deviation $\sigma_{GRRi}$ is calculated for every product, and the average value thereof is calculated as the estimated measurement variation standard deviation $\sigma_{GRR}$. That is, the estimated measurement variation standard deviation $\sigma_{GRR}$ is calculated according to (Equation 10):

[Mathematical Expression 9]

$$\sigma_{GRR} = \frac{\sum_{i=1}^{n} \sigma_{GRRi}}{n} \quad \text{(Equation 10)}$$

According to (Equation 10), for example, the estimated measurement variation standard deviation $\sigma_{GRR}$ can be obtained as 49.35611/1000=0.04936. Based on that the measurement variation standard deviation $\sigma_{GRR}$ being the true value is 0.05000, it can be seen that the estimated measurement variation standard deviation $\sigma_{GRR}$ is obtained at high accuracy by the method according to the third embodiment.

As has been described above, with the product inspection device according to the third embodiment, the measurement variation standard deviation $\sigma_{GRRi}$ is calculated for each product, and the average value of the calculated measurement variation standard deviation is calculated as the measurement variation standard deviation $\sigma_{GRRi}$ of the whole produces. Thus, the measurement variation standard deviation of the product measurement value can be estimated at high accuracy, and the consumer risk CR and the producer risk PR can be calculated at higher accuracy independently of the production distribution, whereby accuracy in determining the conforming articles improves.

Fourth Embodiment

A product inspection device according to a fourth exemplary embodiment is configured similarly to the product inspection device according to the first embodiment and, therefore, the elements are denoted by identical reference characters and a detailed description thereof will not be repeated.

The fourth embodiment is different from the first embodiment in that, a determination region is provided on the conforming article side in the product standard, and when a value falls within the determination regions, a series of processes of calculating the consumer risk and the producer risk is executed.

Figure 18:
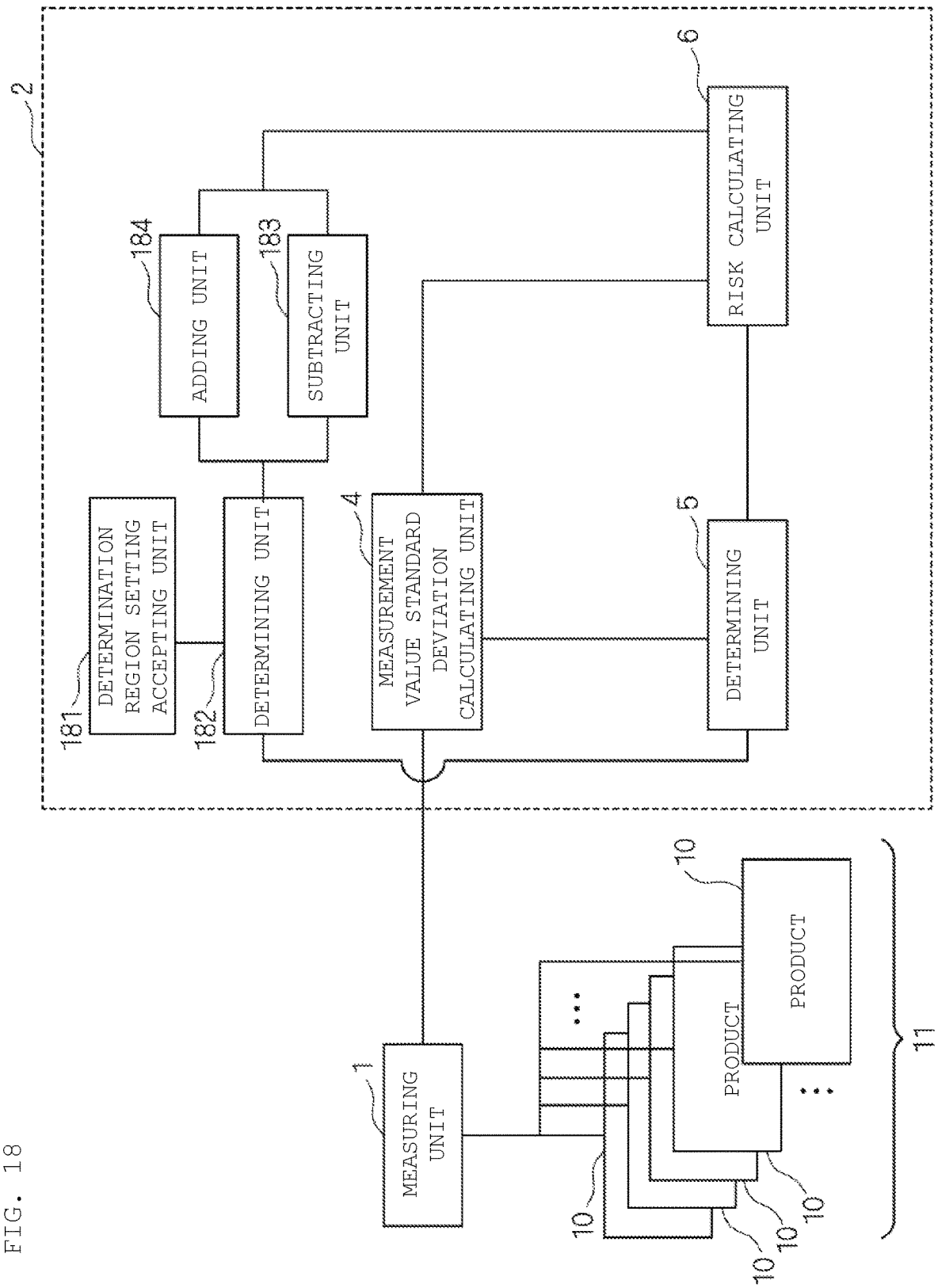
FIG. 18 is a functional block diagram of a product inspection device according to a fourth exemplary embodiment.

FIG. 18 is a functional block diagram of the product inspection device according to the fourth embodiment. In FIG. 18, a determination region setting accepting unit 181 accepts setting of a determination region of a predetermined range on the conforming article side in the product standard. A determining unit 182 determines whether or not the measured product measurement value falls within the determination region.

Upon the determination that the product measurement value falls within the determination region, a subtracting unit 183 instantaneously re-measures the product characteristic value, and subtracts a probability of the conforming/defective determination as to the re-measured product measurement value being correctly made from the calculated consumer risk. An adding unit 184 adds a probability of the conforming/defective determination as to the re-measured product measurement value being erroneously made to the calculated producer risk. The conforming/defective determination is executed based on the obtained consumer risk and producer risk.

Figure 19:
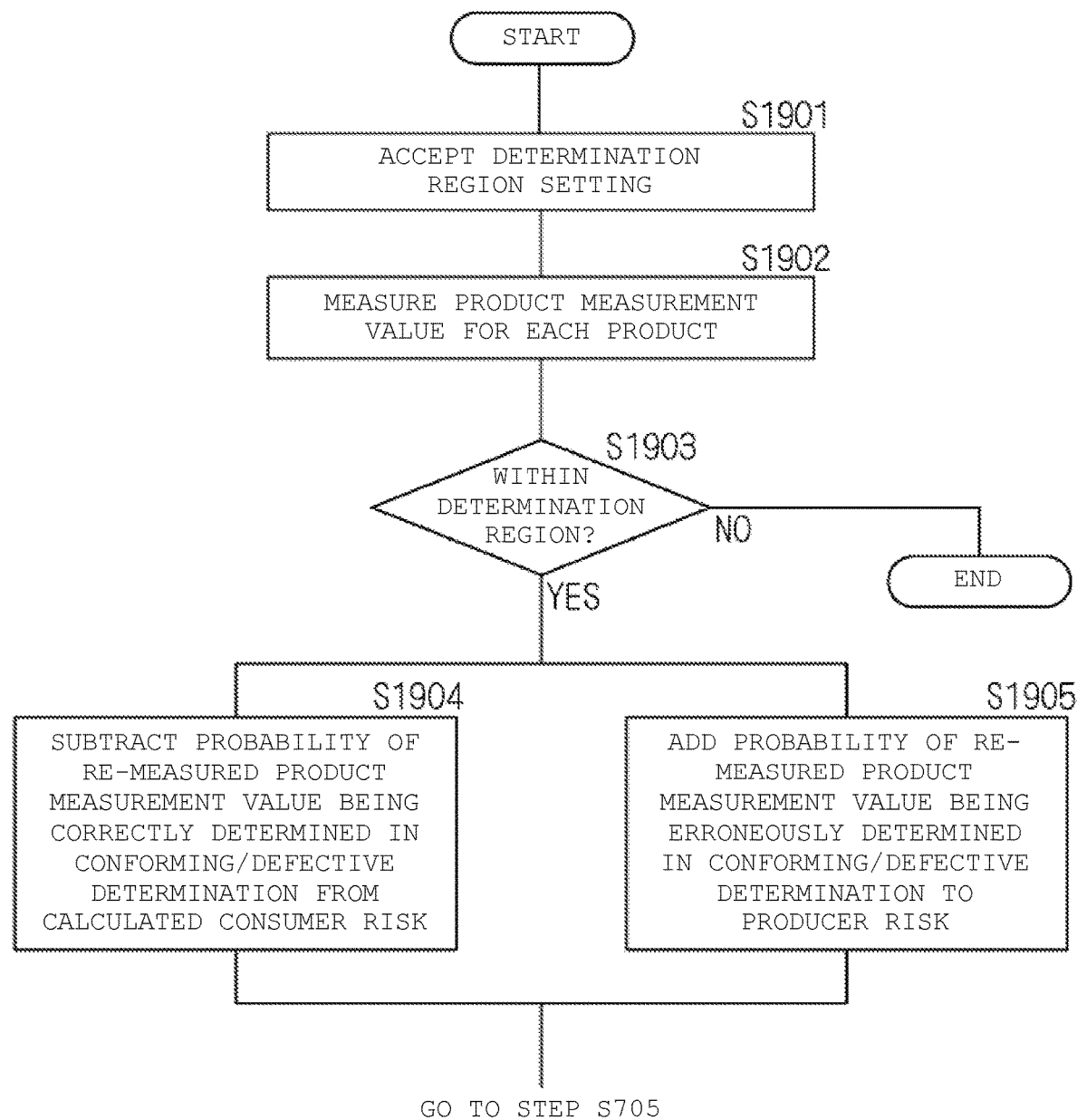
FIG. 19 is a flowchart showing the procedure of calculating the consumer risk in the product inspection device according to the fourth exemplary embodiment.

FIG. 19 is a flowchart showing the procedure of calculating the consumer risk in the product inspection device according to the fourth embodiment. It is noted that, similarly to the first embodiment, distribution of the measured values of the products 10 is a non-specific distribution such as shown in FIG. 8.

Figure 20:
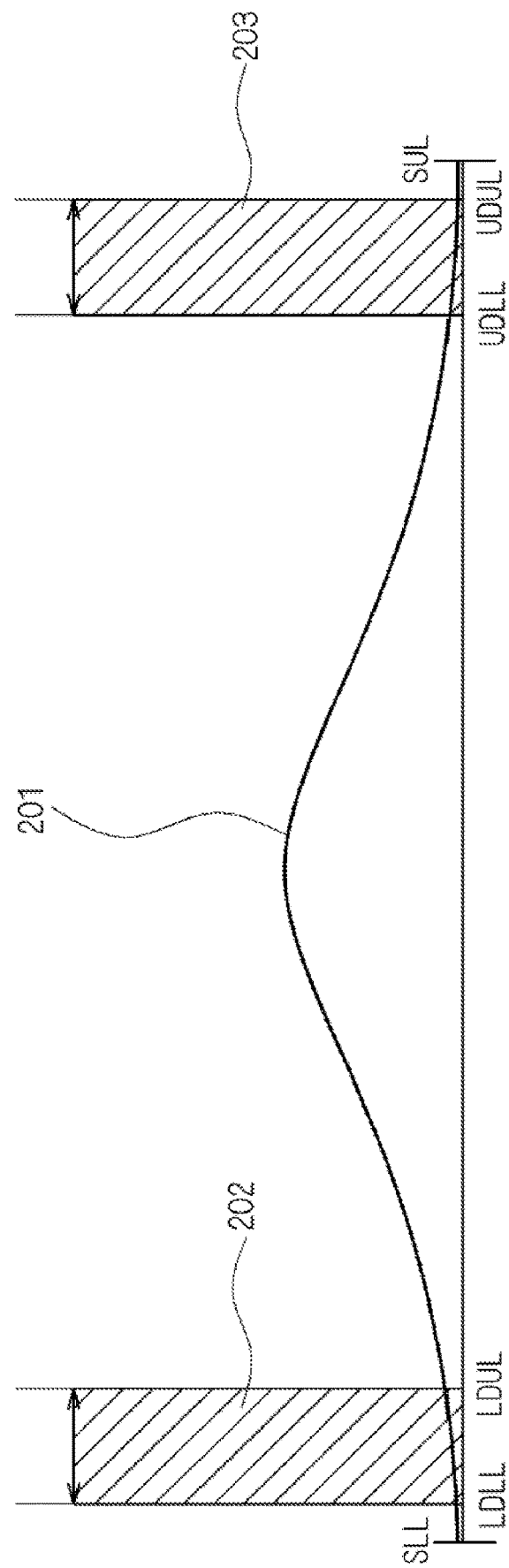
FIG. 20 is a conceptual diagram for describing a determination region in the product inspection device according to the fourth exemplary embodiment.

In FIG. 19, the CPU 21 of the calculation processing unit 2 accepts the setting of the determination region of a predetermined range on the conforming article side in the product standard (step S1901). FIG. 20 is a conceptual diagram for describing the determination region in the product inspection device according to the fourth embodiment.

As shown in FIG. 20, when the product estimated values $x_i'$ of the products 10 are distributed as shown in distribution 201, an upper determination region 203 and a lower determination region 202 are set between the upper limit value SUL in the product standard and the lower limit value SLL in product standard, that is, on the sides where a product is determined as a conforming article. Accordingly, it is set so that the upper limit value SUL in the product standard is greater than an upper limit value UDUL in the upper determination region 203 and the lower limit value SLL in product standard is smaller than a lower limit value LDLL in the lower determination region 202.

Referring again to FIG. 19, the CPU 21 measures the characteristic value representing the predetermined characteristic for each product 10 as the product measurement value (step S1902). The CPU 21 determines whether or not the measured product measurement value falls within a predetermined determination region (step S1903). When the CPU 21 determines that the product measurement value does not fall within the predetermined determination region (step S1903: NO), the CPU 21 makes a conforming/defective determination, and ends the procedure. Specifically, the CPU 21 determines that the product is a defective article when the product measurement value is greater than the upper limit value UDUL in the upper determination region 203 or smaller than the lower limit value LDLL in the lower determination region 202, and determines that the product is a conforming article when the product measurement value is from upper limit value LDUL in the lower determination region 202 to the lower limit value UDLL in the upper determination region 203 inclusive.

When the CPU 21 determines that the measured product measurement value falls within the determination region (step S1903: YES), the CPU 21 instantaneously re-measures the product characteristic value, and subtracts a probability of a re-measured product measurement value being correctly determined in a conforming/defective determination from the calculated consumer risk (step S1904). Alternatively, the CPU 21 adds a probability of the re-measured product measurement value being erroneously determined in the conforming/defective determination to the calculated producer risk (step S1905). The CPU 21 proceeds to step S705 in FIG. 7, and executes the process described above.

Figure 21:
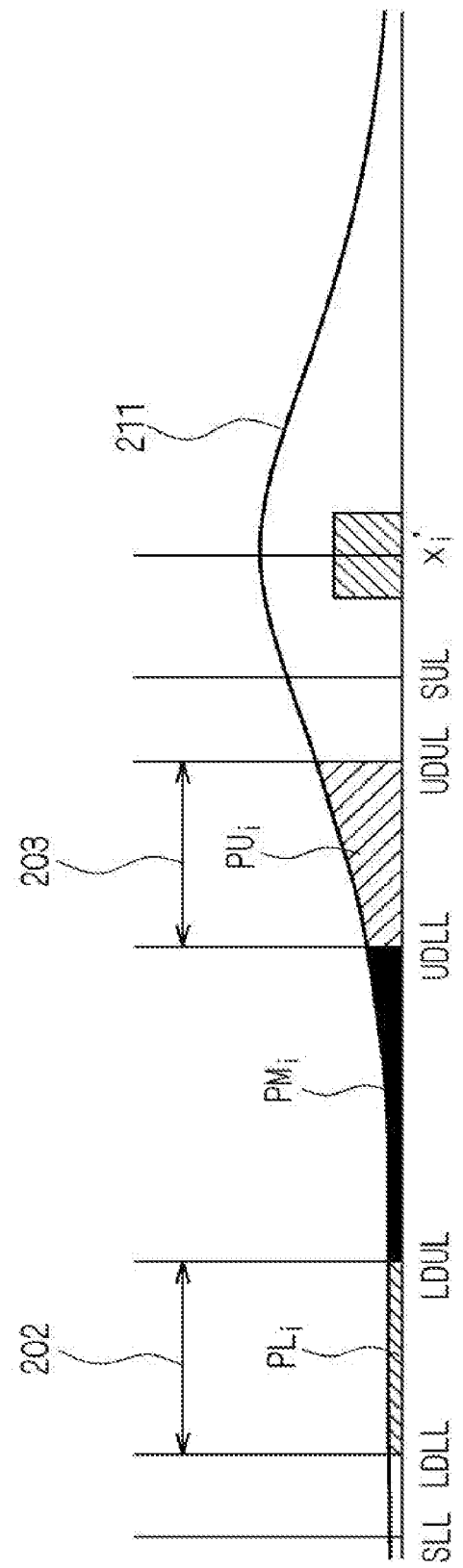
FIG. 21 is a conceptual diagram for describing a method of calculating the consumer risk in the case where the product estimated value is greater than the upper limit value in a product standard in the product inspection device according to the fourth exemplary embodiment.

FIG. 21 is a conceptual diagram for describing the method of calculating the consumer risk in the case where the product estimated value is greater than the upper limit value in the product standard in the product inspection device according to the fourth embodiment. For example, when the product estimated value $x_i'$ is distributed as shown in distribution 211 for a product i, a probability $CR_i$ of occurrence of the consumer risk without use of the predetermined determination region can be calculated by $CR_i = (PL_i + PM_i + PU_i)/n$, where n is the number of products. Here, $PL_i$ is a probability at the portion of the lower determination region 202 in the normal distribution about the product estimated value $x_i'$; $PM_i$ is a probability at the portion between the upper determination region 203 and the lower determination region 202 in the normal distribution about the product estimated value $x_i'$; and $PU_i$ is a probability at the portion of the upper determination region 203 in the normal distribution about the product estimated value $x_i'$. Here, the product estimated value $x_i'$ means the estimation value which is deemed to be the true value obtained by subtracting measurement variations from the product measurement value $x_i$.

By subtracting, from the probability $CR_i$, the probability of a product i whose first measured value has fallen within the determination region being determined as a defective article at the second measurement, the consumer risk can be reduced. That is, the consumer risk CR of the product i can be calculated by: $CR_i = (PL_i + PU_i) \times (1 - (PL_i + PM_i + PU_i))/n$.

Figure 22:
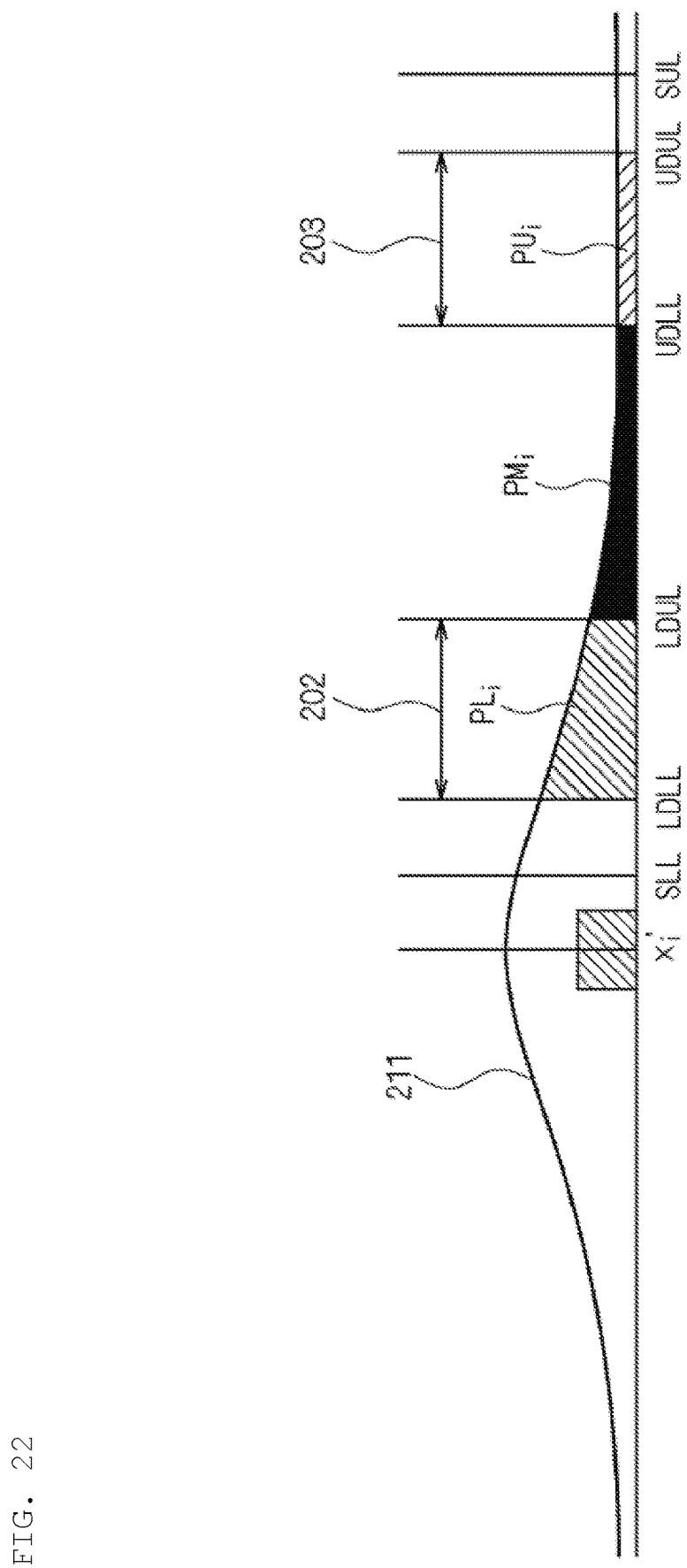
FIG. 22 is a conceptual diagram for describing a method of calculating the consumer risk in the case where the product estimated value is smaller than the lower limit value in the product standard in the product inspection device according to the fourth exemplary embodiment.

FIG. 22 is a conceptual diagram for describing the method of calculating the consumer risk in the case where the product estimated value is smaller than the lower limit value in the product standard in the product inspection device according to the fourth embodiment. For example, when the product estimated value $x_i'$ is distributed as shown in distribution 211 for a product i, the probability $CR_i$ of occurrence of the consumer risk without use of the predetermined determination region can be calculated by $CR_i=(PL_i+PM_i+PU_i)/n$, where n is the number of products.

By subtracting, from the probability $CR_i$, the probability of a product i whose first measured value has fallen within the determination region being determined as a defective article at the second measurement, the consumer risk can be reduced. That is, the consumer risk CR of the product i can be calculated by: $CR_i-(PL_i+PU_i)\times(1-(PL_i+PM_i+PU_i))/n$.

Figure 23:
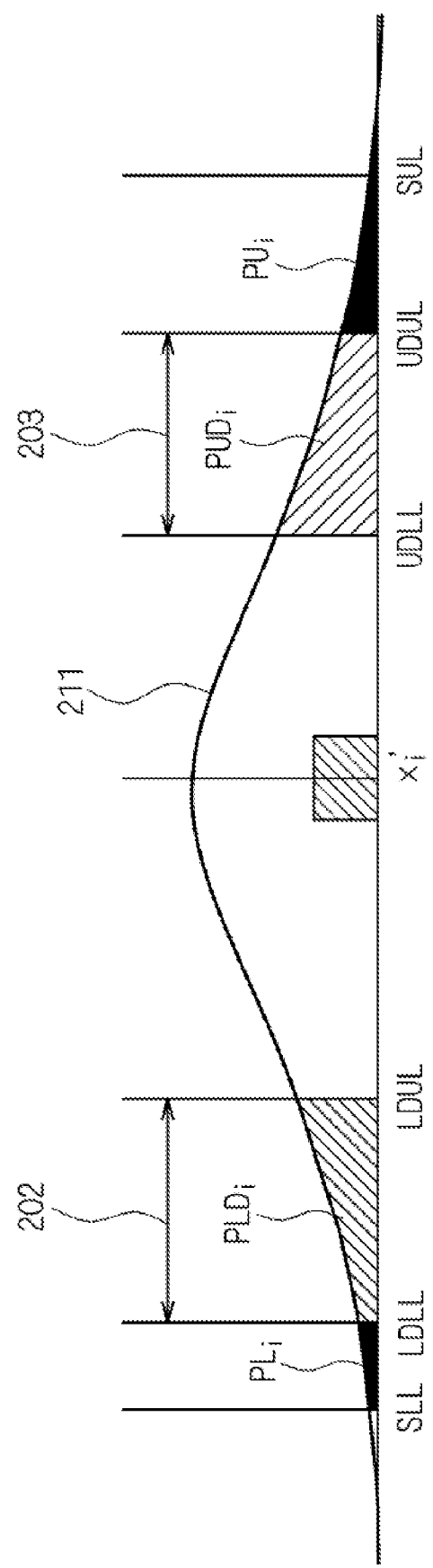
FIG. 23 is a conceptual diagram for describing a method of calculating the producer risk in the case where the product estimated value falls within a range between the lower limit value and the upper limit value inclusive in the product standard in the product inspection device according to the fourth exemplary embodiment.

FIG. 23 is a conceptual diagram for describing a method of calculating the producer risk in the case where the product estimated value falls within a range between the lower limit value and the upper limit value in the product standard in the product inspection device according to the fourth embodiment. For example, when the product estimated value $x_i'$ is distributed as show in distribution 211 for a product i, a probability $PR_i$ of occurrence of the producer risk without use of the predetermined determination region is obtained by dividing the sum of the whole area equal to or smaller than the LDLL and the whole area equal to or greater than the UDLL by n, where n is the number of products. Here, $PLD_i$ is the probability at the portion of the lower determination region 202 in the normal distribution about the product estimated value $x_i'$, and $PUD_i$ is a probability at the portion of the upper determination region 203 in the normal distribution about the product estimated value $x_i'$.

By adding, to the probability $PR_i$, a probability of a product i whose first measured value has fallen within the determination region being determined as a defective article at the second measurement, the producer risk can be calculated more accurately. That is, the producer risk PR of the product i can be calculated by: $PR_i+(PLD_i+PUD_i)\times(PL_i+PU_i)/n$.

Specifically, the upper limit value in product standard SUL=102.0, the lower limit value in product standard SLL=98.0, the upper limit value LDUL in the lower determination region 202=98.2, the lower limit value LDLL in the lower determination region 202=98.1, the upper limit value UDUL in the upper determination region 203=101.9, and the lower limit value UDLL in the upper determination region 203=101.8. The measurement variation standard deviation $\sigma_{GRR}$ is 0.05.

Here, the probability $CR_i$ of occurrence of the consumer risk without use of the determination region is $CR_i=1.07375\times10^2$ (ppm) where n is the number of products, and the probability $PR_i$ of occurrence of the producer risk without use of the determination region is $PR_i=2.60402\times10^4$ (ppm) where n is the number of products. Here, $PL_i$ is a probability at the portion of the lower determination region 202 in the normal distribution about the product estimated value $x_i'$, $PM_i$ is a probability at a portion between the upper determination region 203 and the lower determination region 202 in the normal distribution about the product estimated value $x_i'$, and $PU_i$ is a probability at the portion of the upper determination region 203 in the normal distribution about the product estimated value $x_i'$.

By subtracting, from the probability $CR_i$, the probability of a product i whose first measured value has fallen within the determination region being determined as a defective article at the second measurement, the consumer risk can be reduced. That is, the consumer risk CR of a product i can be calculated by: $CR_i-(PL_i+PU_i)\times(1-(PL_i+PM_i+PU_i))/n$. Then, as described above, subtracting, from the probability $CR_i$, the probability of a product i whose first measured value has fallen within the determination region being determined as a defective article at the second measurement, the consumer risk CR of the product i is calculated by: $CR_i-(PL_i+PU_i)\times(1-(PL_i+PM_i+PU_i))/n=1.40981$ (ppm).

Similarly, adding, to the probability $PR_i$, a probability of a product i whose first measured value has fallen within the determination region being determined as a defective article at the second measurement, the producer risk PR of the product i is calculated by: $PR_i+(PLD_i+PUD_i)\times(PL_i+PU_i)/n=3.25992\times10^4$ (ppm). Thus, it can be seen that the consumer risk is largely artificially reduced.

As has been described above, in the product inspection device according to the fourth embodiment, when the measured value is determined to fall within a determination region, the probability of the re-measured product measurement value being correctly determined in the conforming/defective determination is subtracted from the calculated consumer risk, so as to artificially improve the accuracy of the measuring unit and to reduce the consumer risk.

Note that, it goes without saying that the first to fourth embodiments can be modified within a range not departing from the spirit of the present invention.

DESCRIPTION OF REFERENCE SYMBOLS

1: measuring unit
2: calculation processing unit
3: deemed standard deviation calculating unit
4: measurement value standard deviation calculating unit
5: determining unit
6: risk calculating unit
7: risk adding unit
8: added count determining unit
9: final risk calculating unit
10: product
21: CPU
22: memory
23: storage device
24: I/O interface
25: video interface
26: portable disc drive
27: measurement interface
28: internal bus
90: portable recording medium
230: computer program

The invention claimed is:

1. A product inspection device for inspecting a plurality of products, the product inspection device comprising:

a measuring unit configured to measure as a product measurement value a characteristic value for each of the plurality of products that represents a predetermined characteristic of the plurality of products;

a measurement value standard deviation calculating unit configured to calculate a standard deviation of measurement variations in measurement results of the measuring unit;

a determining unit configured to determine, based on a product standard defining an upper limit value and a lower limit value of the characteristic values for determining conformity/defectiveness of the plurality of products, whether each of the plurality of products is a conforming article based on whether the respective measured product measurement value falls within a range between the upper limit value and the lower limit value;

a risk calculating unit configure to calculate, based on the measurement variations, a consumer risk that is a probability that a product of the plurality of products failing to satisfy the product standard will be erroneously determined as a conforming article by the measurement variations, and a producer risk that is a probability that a product of the plurality of products satisfying the product standard will be erroneously determined as a defective article by the measurement variations;

a risk adding unit configured to successively add up for each product of the plurality of products the calculated consumer risk and the calculated producer risk, respectively;

an added count determining unit configured to determine whether a number of products of the plurality of products having undergone the adding has reached a predetermined number;

a final risk calculating unit configured to calculate, when the number of products having undergone the adding has reached the predetermined number, a final consumer risk and a final producer risk by dividing the added up consumer risk of the plurality of products and the added up producer risk of the plurality of products by the number of products having undergone the adding;

a deemed-basis calculating unit configured to calculate an average value of the measured product measurement values as a deemed average value, and to calculate a standard deviation of the measured product measurement values as a deemed standard deviation;

a variance calculating unit configured to calculate a measurement variations variance based on the calculated deemed average value, and to calculate a deemed variance based on the calculated deemed standard deviation; and a data processing unit configured to calculate a product estimated value by adding the calculated deemed average value to a value obtained by multiplying a square root of (1 the measurement variations variance/the deemed variance) by a deviation of the product measurement values.

2. The product inspection device according to claim 1, wherein the final consumer risk is an updated probability that each of the plurality of products will erroneously be determined as a conforming article when such product fails to satisfy the product standard, and the final producer risk is an updated probability that each of the plurality of products will erroneously be determined as a defective article when such product satisfies the product standard, and wherein the determining unit is configured to classify at least a portion of the plurality of products as conforming to product standards or defective based on the final consumer risk and the final producer risk.

3. The product inspection device according to claim 1, further comprising:

a product measurement value acquiring unit configured to acquire, for a plurality of times, the product measurement values relating to a portion of the plurality of products upon starting a screening of a product lot;

a measurement variations standard deviation calculating unit configured to calculate the standard deviation of measurement variations for each of the plurality of products; and an average value calculating unit configured to calculate an average value of the calculated standard deviation of measurement variations, wherein the average value of the standard deviation of measurement variations is deemed as a standard deviation of measurement variations for all of the plurality of products.

4. The product inspection device according to claim 1, wherein the product inspection device accepts a setting of a determination region of a predetermined range on a conforming article side in the product standard, and wherein the product inspection device determines whether each of the measured product measurement values falls within the determination region.

5. The product inspection device according to claim 4, wherein, when the product inspection device determines that the measured product measurement value falls within the determination region, the product inspection device is further configured to subtract, from the calculated consumer risk, a probability of a re-measured product measurement value being correctly determined in the determining of the conformity/defectiveness of the plurality of products, and the product inspection device is further configured to add, to the calculated producer risk, a probability of the re-measured product measurement value being erroneously determined in the determining of the conformity/defectiveness of the plurality of products.

6. A method for inspecting a plurality of products, the method comprising:

measuring, as a product measurement value, a characteristic value for each of the plurality of products that represents a predetermined characteristic of the plurality of products;

calculating a standard deviation of measurement variations in measurement results;

determining, based on a product standard defining an upper limit value and a lower limit value of the characteristic values for determining conformity/defectiveness of the plurality of products, whether each of the plurality of products is a conforming article based on whether the respective measured product measurement value falls within a range between the upper limit value and the lower limit value;

calculating, based on the measurement variations, a consumer risk that is a probability that a product of the plurality of products failing to satisfy the product standard will be erroneously determined as a conforming article by the measurement variations, a producer risk that is a probability that a products of the plurality of products satisfying the product standard will be erroneously determined as a defective article by the measurement variations;

successively adding up for each product of the plurality of products the calculated consumer risk and the calculated producer risk, respectively;

determining whether a number of products of the plurality of produces having undergone the adding has reached a predetermined number;

calculating, when the number of products having undergone the adding is determined to have reached the predetermined number, a final consumer risk and a final producer risk by dividing the added up consumer risk and the producer risk by the number of products having undergone the adding;

calculating an average value of the measured product measurement values as a deemed average value;

calculating a standard deviation of the measured product measurement values as a deemed standard deviation;

calculating a measurement variations variance based on the calculated deemed average value;

calculating a deemed variance based on the calculated deemed standard deviation; and calculating a product estimated value by adding the calculated deemed average value to a value obtained by multiplying a square root of (1−the measurement variations variance/the deemed variance) by a deviation of the product measurement values.

7. The method according to claim 6,
wherein the final consumer risk is an updated probability that each of the plurality of products will erroneously be determined as a conforming article when such product fails to satisfy the product standard, and the final producer risk is an updated probability that each of the plurality of products will erroneously be determined as a defective article when such product satisfies the product standard, and
wherein the method further comprises classifying at least a portion of the plurality of products as conforming to product standards or defective based on the final consumer risk and the final producer risk.

8. The method according to claim 6, further comprising:
acquiring, for a plurality of times, the product measurement values relating to a portion of the plurality of products upon starting a screening of a product lot;
calculating the standard deviation of measurement variations for each of the plurality of products; and
calculating an average value of the calculated standard deviation of measurement variations, wherein the average value of the standard deviation of measurement variations is deemed as a standard deviation of measurement variations for all of the plurality of products.

9. The method according to claim 6, further comprising:
accepting setting of a determination region of a predetermined range on a conforming article side in the product standard; and
determining whether or not each of the measured product measurement values falls within the determination region.

10. The method according to claim 9, wherein, when the measured product measurement value falls within the determination region, the method further comprises:
subtracting, from the calculated consumer risk, a probability of a re-measured product measurement value being correctly determined in the determining of the conformity/defectiveness of the plurality of products; and
adding, to the calculated producer risk, a probability of the re-measured product measurement value being erroneously determined in the determining of the conformity/defectiveness of the plurality of products.

11. A non-transitory computer readable medium storing a computer program with computer executable instructions capable of being executed with a product inspection device for inspecting a plurality of products, the computer program including computer executable instructions for:
measuring, as a product measurement value, a characteristic value for each of the plurality of products that represents a predetermined characteristic of the plurality of products;
calculating a standard deviation of measurement variations in measurement results;
determining, based on a product standard defining an upper limit value and a lower limit value of the characteristic values for determining conformity/defectiveness of the plurality of products, whether each of the plurality of products is a conforming article based on whether the respective measured product measurement value falls within a range between the upper limit value and the lower limit value;
calculating, based on the measurement variations, a consumer risk that is a probability that a product of the plurality of products failing to satisfy the product standard will be erroneously determined as a conforming article by the measurement variations, and a producer risk that is a probability that a product of the plurality of products satisfying the product standard will be erroneously determined as a defective article by the measurement variations;
successively adding up for each product of the plurality of products the calculated consumer risk and the calculated producer risk, respectively;
determining whether a number of products of the plurality of products having undergone the adding has reached a predetermined number;
calculating, when the added count determining means determines that the number of products having undergone the adding has reached the predetermined number, a final consumer risk and a final producer risk by dividing the added up consumer risk and the added up producer risk by the number of products having undergone the adding;
calculating an average value of the measured product measurement values as a deemed average value, and calculating a standard deviation of the measured product measurement values as a deemed standard deviation;
calculating a measurement variations variance based on the calculated deemed average value, and calculating a deemed variance based on the calculated deemed standard deviation; and
calculating a product estimated value by adding the calculated deemed average value to a value obtained by multiplying a square root of (1−the measurement variations variance/the deemed variance) by a deviation of the product measurement values.

12. The non-transitory computer readable medium according to claim 11,
wherein the final consumer risk is an updated probability that each of the plurality of products will erroneously be determined as a conforming article when such product fails to satisfy the product standard, and the final producer risk is an updated probability that each of the plurality of products will erroneously be determined as a defective article when such product satisfies the product standard, and
wherein the computer program further includes computer executable instructions for classifying at least a portion of the plurality of products as conforming to product standards or defective based on the final consumer risk and the final producer risk.

13. The non-transitory computer readable medium according to claim 11, wherein the computer program further includes computer executable instructions for:
acquiring, for a plurality of times, the product measurement values relating to portion of the plurality of products upon starting a screening of a product lot;
calculating the standard deviation of measurement variations for each of the plurality of product; and
calculating an average value of the calculated standard deviation of measurement variations, wherein the average value of the standard deviation of measurement variations is deemed as a standard deviation of measurement variations for all of the plurality of products.

14. The non-transitory computer readable medium according to claim 11, wherein the computer program further includes computer executable instructions for:

accepting a setting of a determination region of a predetermined range on a conforming article side in the product standard; and determining whether or not each of the measured product measurement values falls within the determination region.

15. The non-transitory computer readable medium according to claim 14, wherein, when the measured product measurement value falls within the determination region, the computer program further includes computer executable instructions for:

subtracting, from the calculated consumer risk, a probability of a re-measured product measurement value being correctly determined in the determining of the conformity/defectiveness of the plurality of products; and adding, to the calculated producer risk, a probability of the re-measured product measurement value being erroneously determined in the determining of the conformity/defectiveness of the plurality of products.

* * * * *